United States Patent [19]

Kitayama et al.

[11] Patent Number: 4,929,523
[45] Date of Patent: May 29, 1990

[54] LIGHT CONTROL SHEETS

[75] Inventors: Shinichiro Kitayama, Minoo; Teruho Adachi, Hirakata; Masahiro Ueda, Minoo; Yuichi Aoki, Tsukuba; Satoshi Shiiki, Yokohama; Akio Takigawa, Nishinomiya; Motoaki Yoshida, Kawanishi; Naoya Imamura, Fujinomiya; Koichi Maeda, Nishinomiya; Hisayuki Kayanoki, Takarazuka, all of Japan

[73] Assignees: Sumitomo Chemical Company Limited; Nippon Sheet Glass Co., Ltd., both of Osaka, Japan

[21] Appl. No.: 133,603

[22] Filed: Dec. 16, 1987

[30] Foreign Application Priority Data

Dec. 18, 1986 [JP] Japan .................. 61-302500
Jun. 11, 1987 [JP] Japan .................. 62-146564
Jun. 11, 1987 [JP] Japan .................. 62-146565
Aug. 7, 1987 [JP] Japan .................. 62-197833
Aug. 7, 1987 [JP] Japan .................. 62-197834
Aug. 7, 1987 [JP] Japan .................. 62-197836
Aug. 7, 1987 [JP] Japan .................. 62-197837

[51] Int. Cl.$^5$ ............................ G03F 1/02
[52] U.S. Cl. ........................... 430/4; 430/14; 430/394; 430/396; 427/163; 428/542.6; 428/912.2; 428/919
[58] Field of Search ............ 430/394, 396, 4, 6, 430/281, 284, 14; 428/423.3, 425.6, 542.6, 912.2, 919; 427/54.1, 165; 522/3, 90, 97

[56] References Cited

U.S. PATENT DOCUMENTS 4,751,145 6/1988 Sebastiano et al. ............ 428/425.6

Primary Examiner—Jose Dees
Attorney, Agent, or Firm—Stevens, Davis, Miller & Mosher

[57] ABSTRACT

A light control sheet capable of scattering an incident light of particular incident angle is produced by a method composed of preparing a film of a composition containing at least two photopolymerizable components having different refractive indexes, irradiating on the film a light from a particular direction, and obtaining a cured film of the light control sheet product. Such other light control sheets as capable of scattering a plurality of incident lights each of particular incident angle are obtained by modification of the above-mentioned method.

10 Claims, 21 Drawing Sheets

F I G. 10
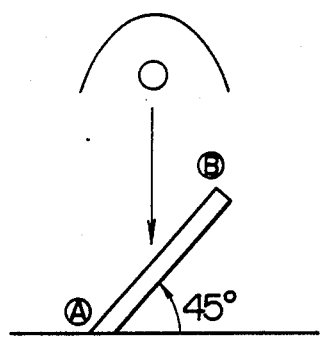
F I G. 11
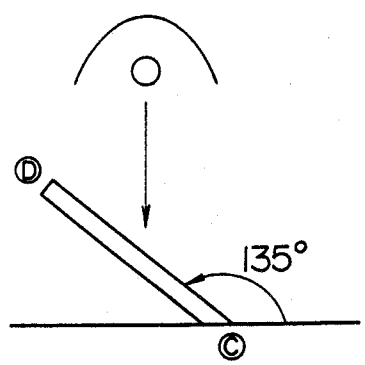
F I G. 12
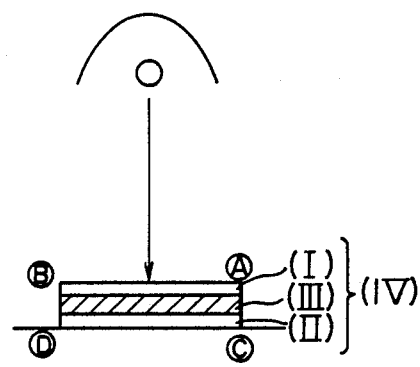

θ = 30°, 50°, 70°, 110°, 130°
150°

FIG. 18
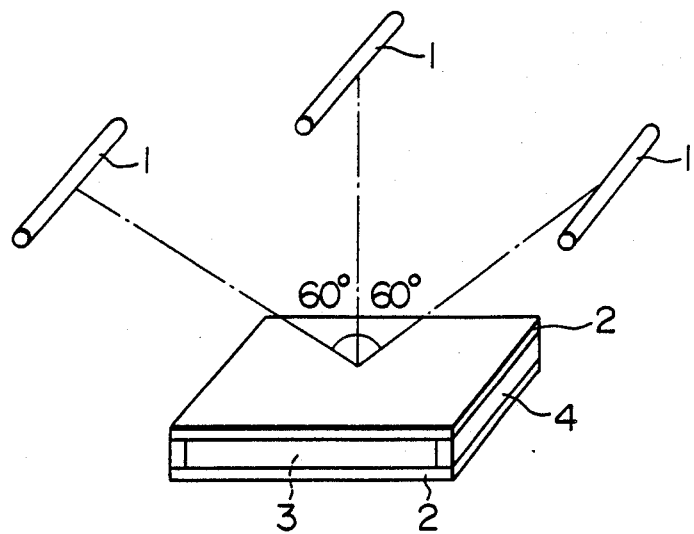
FIG. 19
FIG. 20
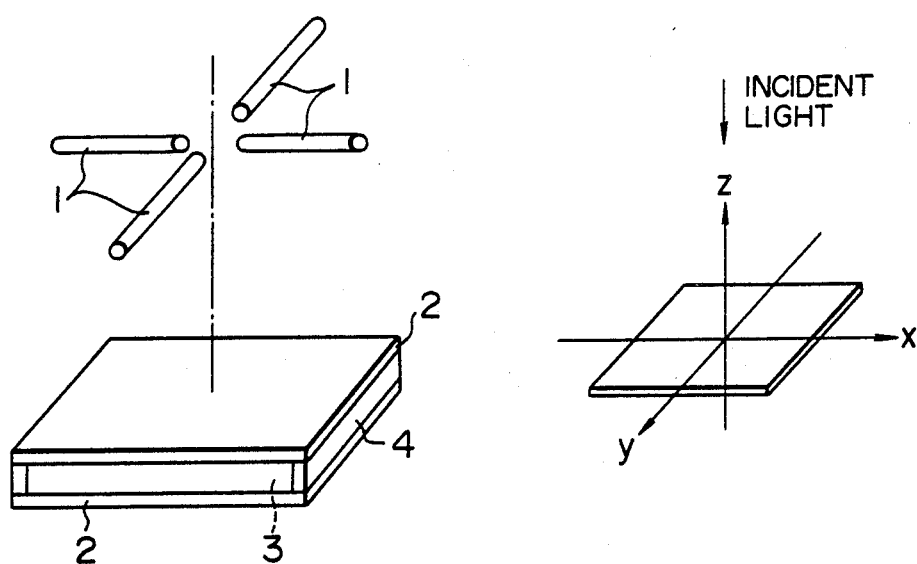

FIG. 21
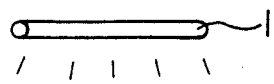
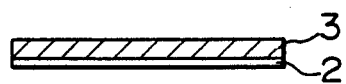
FIG. 22
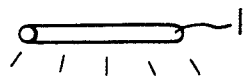
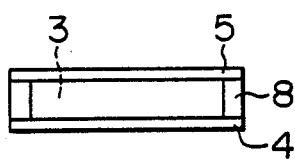
FIG. 23
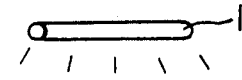
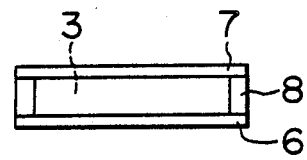

FIG. 33
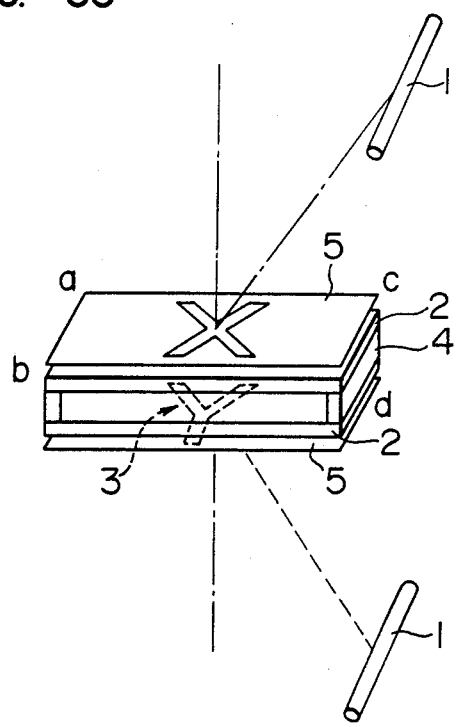
FIG. 34
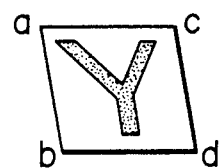 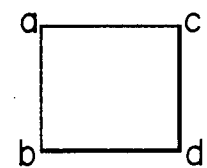 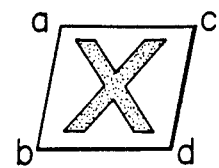
(1) LEFT 45°   (2) ABOVE   (3) RIGHT 45°

FIG. 36
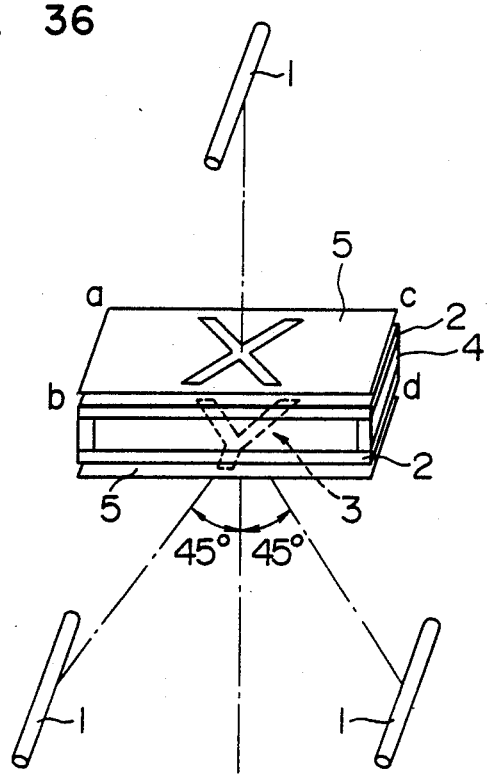
FIG. 37
(1) LEFT 45°  (2) ABOVE  (3) RIGHT 45°
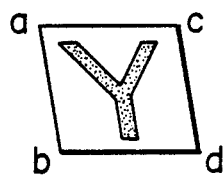 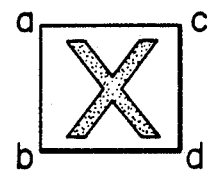 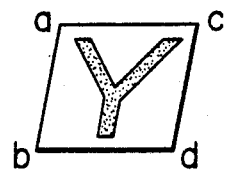

LIGHT CONTROL SHEETS

BACKGROUND OF THE INVENTION

This invention relates to angle-dependent type light control sheets which scatter only incident lights from particular angles and transmit incident lights from all other angles which sheets are obtained by curing a photocurable material, and to the processes for production thereof.

As angle-dependent type light control sheets, there have conventionally been used those of microlouver types having a laminate structure of transparent sheets and opaque sheets [Japanese Patent Kokai (Laid-Open) No. 189439/1982] or those having a controlled visual field obtained by drawing a lattice-like pattern of certain thickness and making the pattern opaque. These microlouvers, however, have a low light transmittance, and gives rise to an interference pattern depending upon the angle of their use. Further, conventional oriented films or light-shielding sheets are produced through complex processes, making them costly or their film qualities nonuniform.

SUMMARY OF THE INVENTION

Hence, it is an object of the present invention to provide angle-dependent type light control sheets of easy production. Another object of the present invention is to provide light control sheets capable of scattering incident lights from a plurality of directions.

According to the present invention, there are provided a light control sheet capable of scattering an incident light of a particular incident angle range and a process for producing said light control sheet which comprises stages of preparing a film of a composition composed of at least two photopolymerizable components having different refractive indexes and irradiating on said film a light from a particular direction to obtain a cured film.

According to the present invention, there are further provided light control sheets each capable of scattering a plurality of incident lights each of particular incident angles or an incident light of wide incident angle range, and the following processes for producing said light control sheets:

(a) a process for producing a light control sheet capable of scattering a plurality of incident lights each of particular incident angle, which comprises a first step of preparing a film of a composition composed of at least two photopolymerizable components having different refractive indexes and irradiating on said film a light from a particular direction to obtain a first cured film, a second step of preparing on the first cured film a film of a composition composed of at least two photopolymerizable compositions having different refractive indexes and irradiating on said film a light from a particular direction different from that in the first step to obtain a second cured film on the first cured film, and, if desired, a step of repeating the second step;

(b) a process for producing a light control sheet capable of scattering a plurality of incident lights each of particular incident angle or an incident light of wide incident angle range, which comprises stages of preparing a film of a composition composed of at least two photopolymerizable components having different refractive indexes and irradiating simultaneously on the film a plurality of lights each from a particular direction of a plurality of light sources provided apart from each other to obtain a cured film;

(c) a process for producing a light control sheet having at least one portion capable of scattering a first incident light of particular incident angle and at least one other portion capable of scattering a second incident light of particular incident angle different from that of the first incident light or totally haze or totally transparent, the process comprising a first step of preparing a film of a composition composed of at least two photopolymerizable components having different refractive indexs and irradiating a light from a particular direction with a linear light source on at least one of the divided film portions to obtain at least one cured film portion, and a second step of curing at least one film portion other than said cured portion by (a) irradiation of a light from a direction and/or a light source different from that in the first step or by (b) a curing method different from that in the first step; and (d) a process for producing a light control sheet having one portion with a first shape capable of scattering an incident light of particular incident angle and another portion with a second shape capable of scattering an incident light of particular incident angle different from that in the former portion in which the two portions may partially overlap with each other, the process comprising stages of preparing a film of a composition composed of at least two photopolymerizable components having different refractive indexes, providing at one side of the film a photomask of a first shape and a first light source so that the photomask is placed between the film and the first light source, providing at the other side of the film a photomask of a second shape and a second light source so that the photomask is placed between the film and the second light source, and irradiating simultaneously lights from the first and second light sources through individual photomask to obtain two cured film portions having the first shape and the second shape, respectively.

The photopolymerizable components used in the present invention are a combination of a plurality of monomers or oligomers which are photopolymerizable under irradiation of such lights as an ultraviolet light. The combination has no restriction as long as the monomers or oligomers have different refractive indexes and adequate compatibility with each other, and is determined by considering the chemical and physical properties of the resin formed by curing of the monomers and/or oligomers. Preferred as the photopolymerizable monomers or oligomers are those having in the molecule a group such as acryloyl, methacryloyl, vinyl or allyl.

As the photopolymerizable components, there are mentioned, for example, polyfunctional acrylates such as polyester acrylate, polyol polyacrylate, modified polyol polyacrylate, polyacrylate having an isocyanuric acid skeleton, melamine acrylate, polyacrylate having a hydrantoin skeleton, polybutadiene acrylate, epoxy acrylate, urethane acrylate, bisphenol A disacrylate, 2,2-bis(4-acryloxyethoxy-3,5-dibromophenyl)propane and the like; corresponding methacrylates; monofunctional acrylates such as tetrahydrofuryl acrylate, ethylcarbitol acrylate, dicyclopentenyloxyethyl acrylate, isobornyl acrylate, phenylcarbitol acrylate, nonylphenoxyethyl acrylate, 2-hydroxy-3-phenoxypropyl acrylate, ω-hydroxyhexanoyloxyethyl acrylate, acryloyloxyethyl succinate, acryloyloxyethyl phthalate, phenyl acrylate, tribromophenyl acrylate, phenoxyethyl acrylate, tribromophenoxyethyl acrylate, benzyl acrylate, p-bromobenzyl acrylate, 2-ethylhexyl acrylate, lauryl acrylate, 2,2,3,3-tetrafluoropropyl acrylate and the like; corresponding methacrylates; vinyl compounds such as styrene, p-chlorostyrene, divinylbenzene, vinyl acetate, acrylonitrile, N-vinylpyrrolidone, vinylnaphthalene and the like; and allyl compounds such as diethyleneglycol bisallylcarbonate, diallylidenepentaerythritol, triallyl isocyanurate, diallyl phthalate, diallyl isophthalate and the like.

These compounds can be used as a monomer or as an oligomer thereof.

In the present invention, these monomers or oligomers are used as a mixture of two or more. The monomers or oligomers to be used as a mixture must have differences in their refractive indexes. The larger the difference in refractive index, the higher is the haze percentage of the cured product. It is preferred that the two or more monomers or oligomers to be used as a mixture have a difference in refractive index of at least 0.01, more preferably at least 0.05. It is also preferred that the two monomers or oligomers having a refractive index difference of at least 0.01 is mixed at a weight ratio of 10:90 to 90:10. The monomers or oligomers used in combination are preferred to have somewhat poor compatibility with each other. When the compatibility is good, the mixture becomes completely uniform and no haze (no cloudiness) is obtained by photocuring. When the compatibility is too poor, phase separation occurs before photocuring and results in a totally haze product.

The light control sheet of the present invention can be obtained by irradiating a light on a thin layer of a mixture of the above monomers or oligomers in the presence of a photopolymerization initiator. The light includes a radiation, an ultraviolet light, a visible light, etc., and an ultraviolet light is preferred. A photopolymerization initiator used in ordinary photopolymerization can be used without any restriction. There can be mentioned, for example, benzophenone, benzil, Michler's ketone, 2-chlorothioxanthone, benzoin ethyl ether, diethoxyacetophenone, benzyl dimethyl ketal, 2-hydroxy-2-methylpropiophenone and 1-hydroxycyclohexyl phenyl ketone as the preferred initiators.

The light control sheet of the present invention can be produced by coating on a substrate a composition composed mainly of the above monomers or oligomers and a photopolymerization initiator or filling said composition in a cell formed with two plates transparent to a light to be applied later for the photopolymerization of the composition and arranged apart from each other by a given distance and then irradiating a light to the composition from a particular direction. The substrate may be of any material as long as it can transmit a light sufficiently for the initiation of the photopolymerization of the composition. It can be, for example, a plate or retainer plate made of transparent glass, plastic or the like. The cell is preferably made of transparent glass, plastic or the like, because at least one side of the cell must transmit a light which is applied for the initiation of the photopolymerization of the composition.

· In the light control sheet of the present invention, its deterioration and yellowing caused by an ultraviolet light during actual use, particularly outdoor use, is undesirable. In order to prevent such deterioration and yellowing by an ultraviolet light, additives such as an ultraviolet absorber and the like are usually added to the composition. However, addition of an ultraviolet absorber and the like to the composition of the present invention hinders the curing of the composition when the curing is caused by an ultraviolet light.

As a measure to overcome the above problem, a photopolymerizable composition is held or coated in a film shape on a colorless or colored, ultraviolet-resistant, transparent substrate and then an ultraviolet light is irradiated on the film from the film side opposite to the ultraviolet-resistant transparent substrate to cure the photopolymerizable composition.

As the ultraviolet-resistant transparent substrate, there is used a glass plate or a plastic sheet or film of ordinary used ultraviolet-resistant ones. And the quality of the plate, sheet or film is specified by the usages of the obtained light control sheet and the wavelength of the ultraviolet source employed for the curing of the composition.

In the process, an ultraviolet absorber and the like are not added to the composition and, moreover, an ultraviolet-resistant transparent substrate is provided on the opposite side to the composition for not receiving the irradiation of an ultraviolet light. Therefore, a light control sheet can be produced with no hindrance in the curing of the composition. In the light control sheet produced according to the process, the cured film can be prevented from deterioration and yellowing by using the side of the ultraviolet-resistant transparent substrate as a light-receiving side.

In the present invention, the composition coated on a substrate or filled in a cell must have a certain film thickness. The film thickness is at least 20 microns, preferably at least 100 microns, more preferably at least 200 microns. The reason is as follows. That is, in the present invention, when the composition is photopolymerized, there is formed, in the vicinity of the surface layer of the cured film, a layer of special structure capable of scattering only an incident light from a particular direction. This layer is considered to comprise minute sheet-shaped pieces having distinguishable refractive indexes and being parallel and directed toward a particular direction. The layer has a thickness of at least 20 microns. Therefore, the film thickness of the coated or filled composition must be at least 20 microns.

The light source for irradiation used in the present invention is required to be able to emit an ultraviolet light or other light which can contribute to the photopolymerization of the composition. In addition, the light source must have a linear shape when viewed from the site of the composition film receiving irradiation.

When a ultraviolet light is used for irradiation, a mercury lamp, a metal halide lamp or the like is ordinarily preferred in view of the easiness of its handling.

The light source preferably has such a size, when viewed from the site of the composition film receiving irradiation, that the visual angle A of the light source in the major axis direction is at least 8°, preferably at least 12°, and the visual angle B in the minor axis direction is A/4 or smaller, preferably A/10 or smaller. A bar-like ultraviolet lamp is one preferred linear light source. When a bar-like ultraviolet lamp (3KW) having a length of about 40 cm and a diameter of about 2 cm is kept horizontally 40 cm above a film of 10 cm × 10 cm so that the lamp becomes parallel to the film surface, the visual angle A is about 54° and the visual angle B is about 3°. Such a lamp is a preferred linear light source in the present invention. Besides the above linear light source, as a linear light source, there can also be used those which appear to be linear when viewed from the site receiving irradiation, including a light source consisting of a large number of point light sources arranged continuously and linearly and a device which scans a light from a laser, etc. using a rotary mirror and a concave mirror (in this case, one irradiation spot is irradiated from a number of different angles).

The cured film formed shows anisotropy in the major axis direction and the minor axis direction of the ultraviolet light source. When the film is rotated around an axis having the same direction as the major axis of the light source, the film scatters a light of particular incident angle.

The incident angle of a light irradiated from a light source on the uncured film for its photopolymerization is defined as a value obtained by subtracting from 90° an angle which a fictitious plane including a point on the film receiving irradiation and the major axis of the light source makes against the film surface. The above irradiation point, when the film has been cured, scatters a light at a highest degree when the light hits the point at an incident angle about equal to the above mentioned incident angle of the light source used for the photopolymerization of the uncured film.

In the cured film, the degree of light scattering and the incident angle range of an incident light at which the light scatters can be varied over a wide range by changing the proportions and/or types of the components of the film composition. Further, when a certain composition is cured, the incident angle range of an incident light at which the light scatters on the resulting cured composition can be varied by changing the incident angle of the ultraviolet light used for the curing of the composition.

The cured film can be evaluated by obtaining the parallel light transmittance and the haze (the haze percentage). They are obtained by calculation from the total light transmittance and scattered light transmittance of the cured film both measured using an integrating sphere type light transmittance measurement apparatus in accordance with JIS K-6714.

BRIEF DESCRIPTION OF THE DRAWINGS

FIGS. 7, 8, 10, 11, 12, 14, 16, 17, 18, 19, 21, 22, 23, 24 and 26 are diagrams illustrating the way of irradiating light.

FIG. 20 is a diagram illustrating the method for measuring haze percentage.

FIGS. 25, 28, 29, 30, 31, 33, 36 and 39 are diagrams illustrating the way of irradiating light over a photomask.

FIGS. 34 and 37 are views showing light control.

DESCRIPTION OF THE PREFERRED EMBODIMENT(S)

Figure 1:
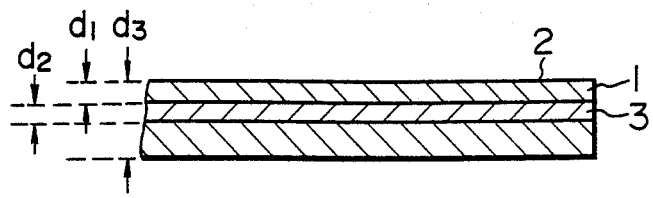
FIGS. 1 to 5 are diagrams illustrating the light irradiation and the microstructure of the photo control film.
Figure 2:
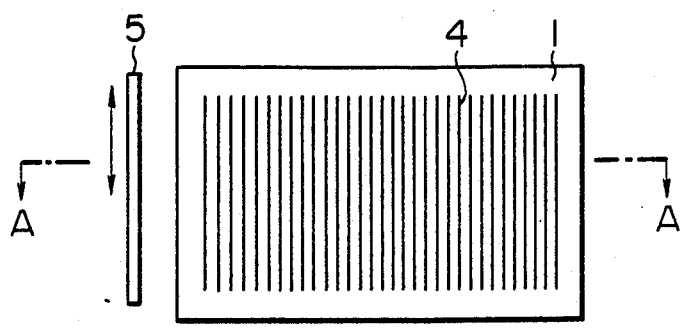
Figure 3:
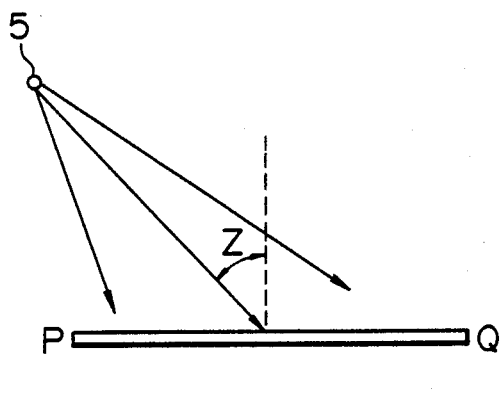
Figure 4:
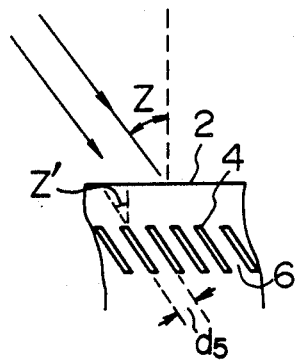
Figure 5:
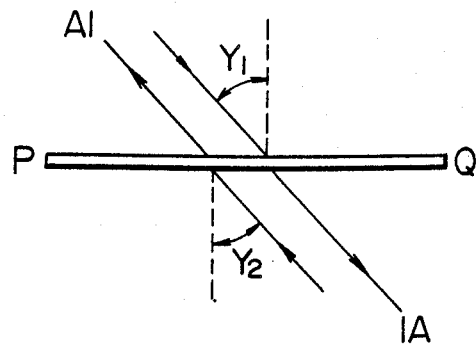
Figure 6:
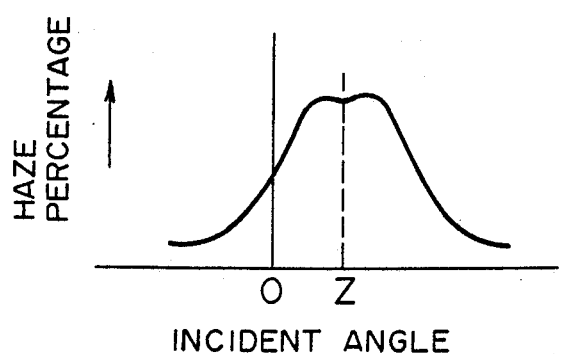
FIGS. 6, 9, 13, 15, 27, 32, 35, 38 and 40 are graphs indicating the dependency of the haze percentage on incident angle of irradiation for the preparation of a photo control film.

As one embodiment of the present invention, there is described, referring to Figures, a cured film obtained by (a) providing a linear light source on a film-shaped composition kept horizontally, in such a state that the light source is about 40 cm above the film at a position about 45° tilted from a plane including the film center and perpendicular to the film surface, and that the lengthwise direction of the light source is parallel to the plane and horizontal, and then (b) irradiating a light on the film from the light source to cure the film. As seen in FIG. 1 showing the cross section of the cured film, a microstructure layer 3 is formed in the vicinity of the irradiated surface 2 of the cured film. This layer 3 has a thickness $d_2$ of about 10 to 2000 microns and its depth $d_1$ from the irradiated surface 2 is 0 to 500 microns. The film thickness $d_3$ is ordinarily 10 to 5000 microns. As seen in FIG. 2 (a plan view) and FIG. 3 (a side view) both of the cured film, the microstructure layer 3 comprises a large number of minute thin pieces 4 each directed parallel to the lengthwise direction of the linear light source 5. As seen in FIG. 4 showing a section obtained by cutting the FIG. 2 film at an A—A line, each of the minute pieces 4 is tilted from the above perpendicular plane by an angle $Z'$ which is smaller than the incident angle $Z$ of an irradiation light from the light source 5. This angle $Z'$ is about equal to the refraction angle at which the light from the light source 5 refracts in the film. The pitch $d_5$ of the minute pieces 4 is 0.01 to 50 microns. With respect to the selective light scattering of film in FIG. 5, an incident light arriving at one film side at an incident angle $Y_1$ equal to the above $Z$ and an incident light arriving at the opposite film side at an incident angle $Y_2$ also equal to the $Z$ are scattered at the highest degree. In other words, when the back side of the film is seen through the film at the angle $Y_1$ or $Y_2$, the cured film looks most cloudy and the visual field is hindered. In addition to the above lights having the incident angle $Y_1$ or $Y_2$, all lights which are on a plane including these two lights and perpendicular to the cured film surface and incident on the cured film are also scattered at the highest degree. FIG. 6 shows the haze percentages of the cured film toward various lights of different incident angles. The haze percentage is maximum at around the incident angle of $Z$, giving a mountain-shaped graph.

The degree of light scattering and the incident angle range of an incident light at which the light scatters can be changed over a wide range by changing the proportions and/or types of the components of the film composition. They can also be changed greatly by changing the irradiation conditions such as the distance of the light source, the size of the light source (e.g. the visual angles A and B) and the output of the light source.

For example in the above embodiment, when the size of the light source is too small and the visual angle A in the major axis direction is smaller than 8°, the anisotropy of the cured film becomes insufficient, and when the visual angle A is smaller than 5°, the cured film no longer shows anisotropy and scatters incident lights from all directions. Thus, the cured film obtained by using a point light source or substantially parallel lights gives light scattering of no directionality.

Conversely, when the size of the light source is too large, the resulting cured film gives a haze percentage graph having a lower height. When the light source has a visual angle B larger than 100°, the cured film no longer shows anisotropy. In other words, the cured film looks transparent when viewed from all directions and gives no light scattering. As such a light source, there can be mentioned a planar light source provided relatively close to the uncured film, or a diffusion type light source. The cured film obtained by thermal polymerization is also transparent.

The reason why the cured film obtained by using a linear light source gives selective light scattering is not clear but can be presumed as follows. In FIG. 4, the minute pieces 4 and the substance 6 existing between them presumably have different refractive indexes (this difference in refractive index is considered to have a close connection with the refractive index difference between the photopolymerizable monomers or oligomers used as the raw materials of the film composition). A light entering the cured film at an angle close to the inclination angle $Z'$ of the minute pieces hits the surface of a minute piece 4 at an angle larger than the critical reflection angle determined by the refractive indexes of the minute pieces 4 and the substance 6, and is reflected, and this reflection is repeated on other minute pieces, whereby the lights leaving the cured film become a scattered light as a whole. When the refraction angle of the light entering the film deviates largely from the inclination angle $Z'$, the angle of the light hitting the minute piece becomes smaller than the critical reflection angle and reflection decreases, whereby the lights leaving the cured film are parallel. In FIG. 6, a slight hollow (a small reduction in haze percentage) is observed at the top of the haze percentage graph. This phenomenon occurs presumably because a light having an incident angle $Z$ very close to the inclination angle $Z'$ of the minute pieces 4 makes no reflection on the minute pieces and moves straight between the two adjacent minute pieces.

The above description has been made on the case a light is irradiated only from one side of the film. When the film had a relatively large thickness and light irradiation was made from the both sides of the film simultaneously, it was observed that the two microstructure layers were formed inside the film in the vicinity of each film surface.

When the light source is a planar or diffusion type, no microstructure is formed and the resulting cured film is transparent and gives no selective light scattering. When the light source is a point type, though the microstructure is formed within the cured film which differs from the case of a linear light source and is arranged randomly without any regularity; therefore, it is presumed that all incident lights are reflected within the microstructure and the lights leaving the film are scattered to all directions.

The light control sheet of the present invention is a plastic sheet. It can also be used by coating on a glass plate, etc. The light control sheet or the coated plates are expected to be used in various applications such as window glass, vehicles, displays, mirrors and greenhouses.

As mentioned above in the present invention, there can be produced a cured sheet for a light control sheet capable of selectively scattering only a light of particular incident angle. Further in the present invention, there can also be produced a light control sheet capable of selectively scattering a plurality of lights of at least two different incident angles through a process comprising a first step of forming the above-mentioned cured sheet, a second step of preparing on said cured sheet a film of the same or different composition as that used in the first step and irradiating a light from a particular direction different from that used in the first step to obtain a second cured sheet on the first cured sheet and, if desired, a step of repeating the second step.

In repeating the second step, the direction of the irradiating light is changed each time, whereby can be produced a light control sheet capable of selectively scattering a plurality of lights of at least three different incident angles.

A light control sheet capable of scattering lights of at least two different incident angles can be produced simply by using compositions of the same recipe and curing each of them with a light of different incident angle, however, each composition to be repeated may have a different recipe.

Further in the present invention, there can also be produced a light control sheet capable of scattering lights having a plurality of different incident angles or a light of wide incident angle range through a process comprising simultaneously irradiating on the film-shaped composition lights from a plurality of linear light sources arranged apart from each other.

The arrangement of the linear light sources is appropriately made so as to meet the requirements for the light control sheet to be produced in such respects as the direction and angle of light control. The larger the number of the light sources, the lower is the maximum haze percentage of the resulting light control sheet. When a plurality of linear light sources are arranged parallel to each other, it is preferred that these light sources have a visual angle of at least 10° when viewed from the site of the composition receiving irradiation. If a number of light sources are arranged without being separated, no selective light scattering is obtained as described later.

In this process, lights are simultaneously irradiated on the composition film from a plurality of linear light sources arranged apart. If the irradiations from these light sources are made at different timings, the composition film is cured by the light irradiated earlier and the resulting light control sheet can not scatter lights of a plurality of different incident angles or a light of wide incident angle range.

In the above process of simultaneously irradiating lights on a composition film from a plurality of linear light sources, the previously mentioned minute pieces present in the microstructure layer are presumed to take a form of a mixture of different minute piece groups each having an inclination angle substantially same as the incident angle of a light from each light source. As a result, the light control sheet can scatter lights having a plurality of different incident angles or a light of wide incident angle range.

According to this process, the conventional ultraviolet-cured light control sheet capable of scattering only a light of single direction and narrow incident angle range can be improved to a light control sheet capable of controlling lights of a plurality of different incident angles or a light of wide incident angle range.

Further in the present invention, there can also be produced a light control sheet having at least one portion capable of scattering a first light of particular incident angle and at least one other portion capable of scattering a second light of particular incident angle different from that of the first light or totally hazy or totally transparent through a process comprising stages of dividing the surface of a composition film into a plurality of portions by means of, for example, a photomask, irradiating a light from a first linear light source on at least one surface portion, for example, corresponding to the aperture of the photomask to cure the portion, irradiating a light from a different angle from a second light source on at least one other surface portion, for example, covered by the photomask to cure the portion, and if there remain uncured portions, they are cured by photopolymerization or thermal polymerization. The irradiation by the second linear light source can be replaced by the irradiation by a point light source, parallel lights or diffused lights, or by heat. The irradiations by the first linear light source and the second linear light source or its alternate can be conducted simultaneously or separately. Obtaining a cured portion with an exact shape using heat is generally difficult; therefore, when a cured portion with an exact shape is desired, it is preferred that the irradiation by the first linear light source be made first to obtain such a cured portion and then heat is applied to cure the remaining portion.

According to this process, the conventional ultraviolet-cured light control sheet capable of controlling through the entire sheet only a light of single direction and single incident angle could be improved to a light control sheet having a plurality of portions capable of scattering lights of a plurality of different incident angles.

Further in the present invention, there can also be produced a light control sheet having a plurality of portions each having a different shape and capable of scattering a light of particular and different incident angle in which said portions may partially overlap with each other through a process comprising stages of providing at one side of a film composition a photomask of first shape and a first linear light source so that the photomask is placed between the film and the first light source, providing at the other side of the film a photomask of second shape and a second linear light source so that the photomask is placed between the film and the second light source, and simultaneously irradiating lights from the first and second light sources through the two photomasks to obtain two cured portions having the first shape and the second shape, respectively.

In production of the light control sheet of the present invention, the light-controlling function is generated during curing of the film composition. Accordingly, in order for each side of the cured film to have a different light-controlling function, it is desirable that two different photomasks be provided at the both sides of the film and two different lights for photopolymerization of, for example, two different ultraviolet lights be simultaneously irradiated through the photomasks. If only one side is irradiated earlier, the curing of the film proceeds to the other side and it becomes impossible to allow the other side to have a light-controlling function. The portions of the film composition which remain uncured as a result of masking by the two photomasks are polymerized by an ultraviolet light or heat.

In this process, when the composition is photopolymerized in a cell, the both sides of the cell must transmit the lights used for photopolymerization. Therefore, the both sides of the cell are preferred to be made of such a material as a transparent glass, a plastic or the like.

In this process, the composition coated on a substrate or filled in a cell must have a film thickness of at least 40 microns, because it is required to form in the film in the vicinity of each surface of the film a microstructure layer comprising minute sheet-shaped pieces of different refractive indexes which are parallel and directed toward a particular direction.

According to this process, the conventional ultraviolet-cured light control sheet capable of controlling through the entire sheet only a light of single direction and single incident angle could be improved to a light control sheet having a plurality of portions each having a different shape and capable of scattering a light of particular and different incident angle in which said portions may partially overlap with each other.

The present invention is described in more detail below by way of Examples. However, it is in no way restricted by these Examples.

Figure 41:
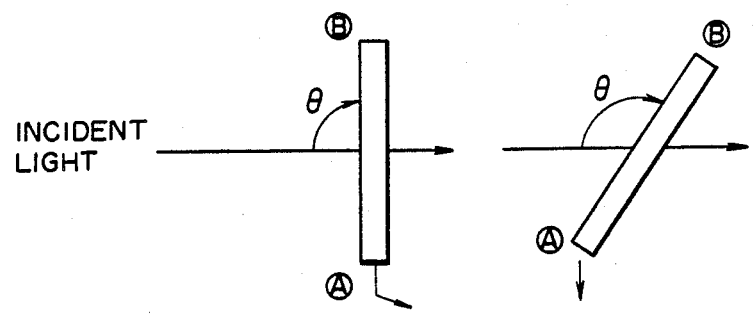
FIG. 41 is a diagram illustrating the measurement of transparency.

In the following Examples and Comparative Examples, total light transmittance and scattered light transmittance were measured using an integrating sphere type light transmittance measurement apparatus in accordance with JIS K 6714, and from these transmittances, parallel light transmittance and haze percentage were calculated. This measurement method is shown in FIG. 41.

The refractive index of a monomer or oligomer was measured with an Abbe's refractometer at 20° C.

EXAMPLE 1

One hundred parts of a polyether-urethane acrylate having the refractive index of 1.481, obtained by the reaction between a polypropylene glycol having an average molecular weight of 2000, toluene diisocyanate and 2-hydroxyethyl acrylate was mixed with 100 parts of N-vinylpyrrolidone having the refractive index of 1.509 and 6 parts of benzyl dimethyl ketal to prepare a resin composition. The composition was poured between glass plates having a spacer of 1 mm in thickness between them. An ultraviolet light was irradiated for two minutes using a mercury lamp of 120W provided 30 cm (perpendicular distance) above the glass plates to obtain a cured sheet. The sheet was measured for physical properties such as parallel light transmittance and haze percentage. The results are shown in Table 1.

EXAMPLE 2

One hundred parts of a polyether-urethane acrylate having the refractive index of 1.490, obtained by the reaction between a polytetramethylene ether glycol having an average molecular weight of 2000, toluene diisocyanate and 2-hydroxyethyl acrylate was mixed with 100 parts of tribromophenoxyethyl acrylate and 6 parts of benzyl dimethyl ketal to prepare a resin composition. The composition was cured in the same manner as in Example 1 to obtain a cured sheet. The sheet was measured for physical properties. The results are shown in Table 1.

EXAMPLE 3

One hundred parts of a bisphenol A type epoxy acrylate having a refractive index of 1.560 was mixed with 100 parts of 2,2,3,3-tetrafluoropropyl acrylate having the refractive index of 1.363 and 6 parts of benzyl dimethyl ketal to prepare a resin composition. The composition was cured in the same manner as in Example 1 to obtain a cured sheet. The sheet was measured for physical properties. The results are shown in Table 1.

EXAMPLE 4

A cured sheet was obtained from the resin composition of Example 2 in the same manner as in Example 3 except that the ultraviolet light was irradiated at an angle of 45°. The sheet was measured for haze percentage. The angle at the maximum haze percentage was 45° which was smaller by 45° than that in Example 3.

EXAMPLE 5

One hundred parts of N-vinylpyrrolidone was mixed with 100 parts of 2,2,3,3-tetrafluoropropyl acrylate and 6 parts of 2-hydroxy-2-methyl-propiophenone to prepare a resin composition. The composition was poured between two glass plates having a spacer of 1 mm in thickness between them. An ultraviolet light was irradiated for 8 minutes from a mercury lamp (80W, 40 cm in length) provided 40 cm (perpendicular distance) above the plates, to obtain a cured sheet. The sheet was measured for physical properties in the same manner as in Example 1. The results are shown in Table 1.

EXAMPLE 6

One hundred parts of a compound (I) represented by the following structural formula (I)

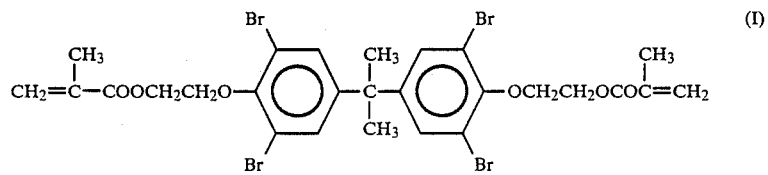

was mixed with 100 parts of a polyethylene glycol dimethacrylate having the average repeating unit number of 14 to prepare a resin composition. The composition was cured in the same manner as in Example 5 to obtain a cured sheet. The sheet was measured for physical properties in the same manner as in Example 1. The results are shown in Table 1.

EXAMPLE 7

Thirty parts of the same polyether-urethane acrylate as used in Example 1 was mixed with 70 parts of an equal-amount mixture having a refractive index of 1.590, of tribromophenyl acrylate and a compound (II) represented by the following structural formula (II),

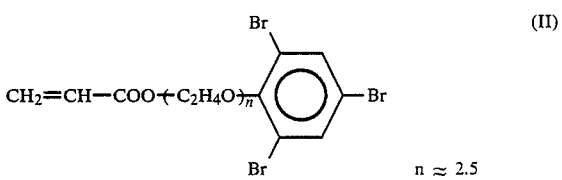

and 3 parts of 2-hydroxy-2-methyl-propiophenone to prepare a resin composition. The composition was cured in the same manner as in Example 5 to obtain a cured sheet. The sheet was measured for physical properties in the same manner as in Example 5. The results are shown in Table 1.

TABLE 1

|  |  | Angle (°) | | | | | | |
| --- | --- | --- | --- | --- | --- | --- | --- | --- |
|  |  | 70 | 80 | 90 | 100 | 110 | 120 | 130 |
| Example 1 | Total light transmittance (%) | 88.2 | 88.4 | 90.4 | 86.1 | 87.9 | 88.1 | 88.0 |
|  | Scattered light transmittance (%) | 1.4 | 1.5 | 3.4 | 28.4 | 1.4 | 1.5 | 1.4 |
|  | Parallel light transmittance (%) | 86.8 | 86.9 | 87.0 | 57.7 | 86.5 | 86.5 | 86.6 |
|  | Haze percentage (%) | 1.6 | 1.7 | 3.8 | 33.0 | 1.6 | 1.7 | 1.6 |
| Example 2 | Total light transmittance (%) | 87.3 | 86.3 | 86.6 | 87.5 | 83.9 | 86.9 | 87.0 |
|  | Scattered light transmittance (%) | 3.5 | 24.9 | 54.9 | 38.7 | 3.4 | 3.4 | 3.3 |
|  | Parallel light transmittance (%) | 83.8 | 61.4 | 31.7 | 48.8 | 80.5 | 83.5 | 83.7 |
|  | Haze percentage (%) | 4.1 | 28.9 | 63.4 | 44.2 | 4.1 | 3.9 | 3.8 |
| Example 3 | Total light transmittance (%) | 88.5 | 92.6 | 91.2 | 88.4 | 88.1 | 88.4 | 88.2 |
|  | Scattered light transmittance (%) | 8.1 | 66.5 | 58.0 | 5.8 | 1.5 | 1.5 | 1.4 |
|  | Parallel light transmittance (%) | 80.4 | 26.1 | 33.2 | 82.6 | 86.6 | 86.9 | 86.8 |
|  | Haze percentage (%) | 9.2 | 71.8 | 63.6 | 6.6 | 1.7 | 1.7 | 1.6 |
| Example 5 | Total light transmittance (%) | 88.0 | 88.4 | 88.5 | 88.1 | 88.2 | 88.4 | 88.2 |
|  | Scattered light transmittance (%) | 1.5 | 3.3 | 17.7 | 1.5 | 1.5 | 1.5 | 1.5 |
|  | Parallel light transmittance (%) | 86.5 | 85.1 | 70.8 | 86.6 | 86.7 | 86.9 | 86.7 |
|  | Haze percentage (%) | 1.7 | 3.7 | 20.0 | 1.7 | 1.7 | 1.7 | 1.7 |
| Example 6 | Total light transmittance (%) | 87.0 | 86.7 | 86.6 | 86.6 | 86.8 | 87.0 | 87.0 |
|  | Scattered light transmittance (%) | 1.5 | 5.2 | 47.9 | 5.2 | 1.5 | 1.5 | 1.5 |
|  | Parallel light transmittance (%) | 86.5 | 81.5 | 88.7 | 81.4 | 85.8 | 85.5 | 85.5 |
|  | Haze percentage (%) | 1.7 | 6.0 | 55.8 | 6.0 | 1.7 | 1.7 | 1.7 |
| Example 7 | Total light transmittance (%) | 94.4 | 98.5 | 94.9 | 93.6 | 91.5 | 90.9 | 90.5 |
|  | Scattered light transmittance (%) | 62.4 | 76.6 | 78.6 | 76.5 | 40.5 | 8.2 | 1.2 |

TABLE 1-continued

| | Angle (°) | | | | | | |
|---|---|---|---|---|---|---|---|
| | 70 | 80 | 90 | 100 | 110 | 120 | 130 |
| Parallel light transmittance (%) | 32.0 | 16.9 | 16.3 | 17.1 | 51.0 | 82.7 | 89.3 |
| Haze percentage (%) | 66.1 | 81.9 | 82.8 | 81.7 | 44.8 | 9.0 | 1.8 |

EXAMPLE 8

Fifty parts of a polyether-urethane acrylate having a refractive index of 1.481, obtained by the reaction between a polypropylene glycol having an average molecular weight of 2000, toluene diisocyanate and 2-hydroxyethyl acrylate was mixed with 50 parts of a compound (III) having the refractive index of 1.567, represented by the following structural formula (III)

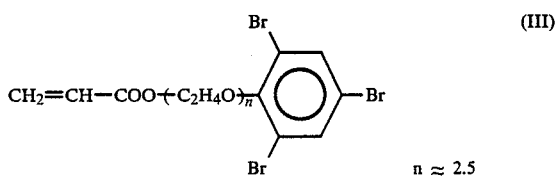

Figure 7:
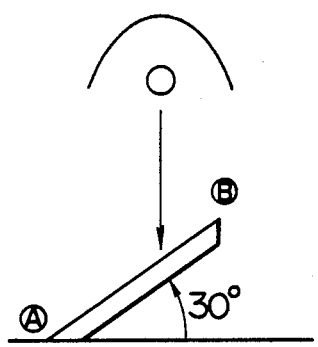
Figure 8:
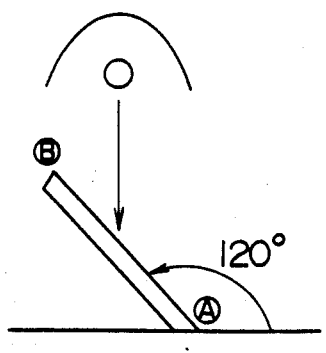
Figure 9:
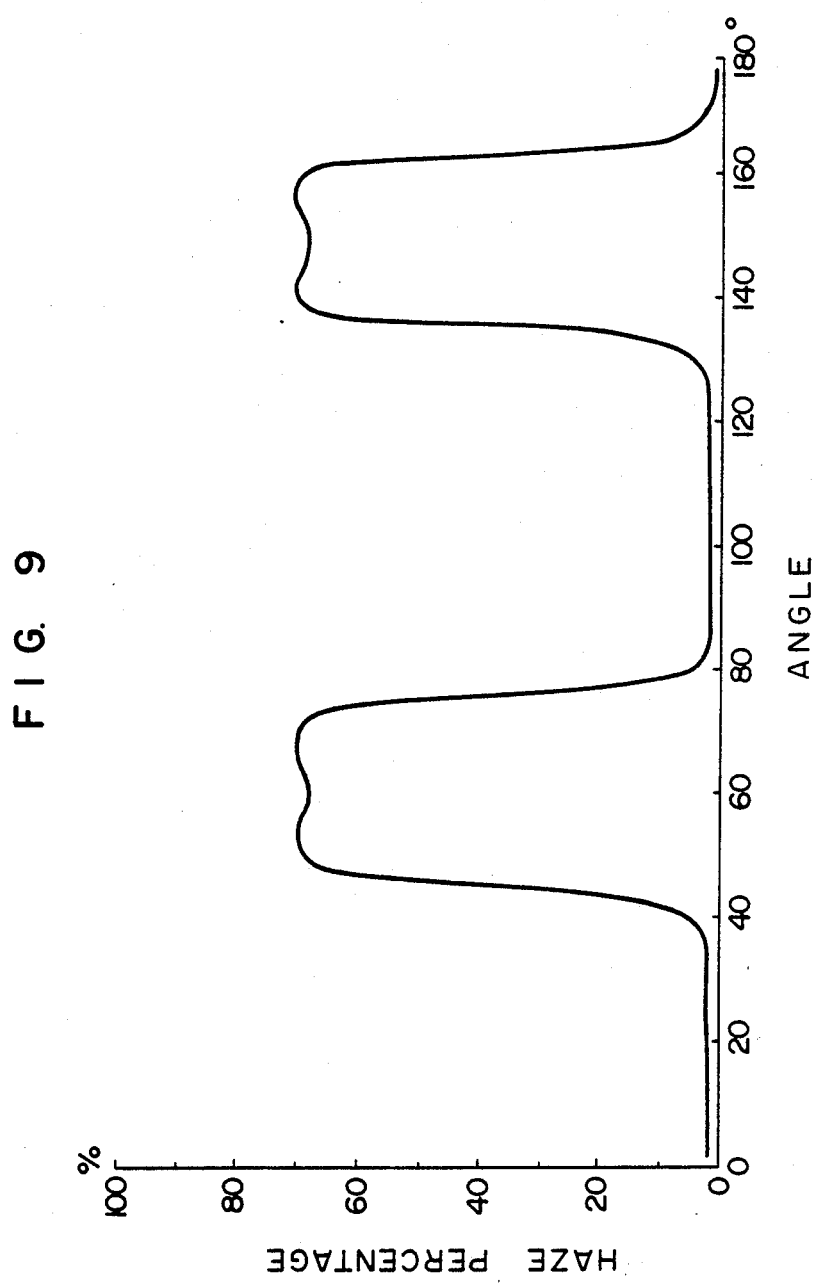

$n \approx 2.5$ and 3 parts of 2-hydroxy-2-methyl-propiophenone to prepare a resin composition. The composition was poured between two glass plates having a spacer of 200 microns in thickness between them. As shown in FIG. 7, an ultraviolet light was irradiated for 3 minutes at a distance of 40 cm and an angle of 30° using a mercury lamp (80W, 40 cm in length) to obtain a cured sheet. Thereafter, one glass plate was removed, and on the cured sheet was formed a cell comprising a glass plate and the cured sheet having a spacer of 200 microns in thickness between them. The same composition as above was filled in the cell. As shown in FIG. 8, an ultraviolet light was irradiated for 3 minutes at a distance of 40 cm and an angle of 120° using the same mercury lamp to obtain a cured sheet on the previously formed cured sheet. This lamination type sheet was measured for haze percentages at various angles. The resulting angle dependency of haze percentage is shown in FIG. 9.

EXAMPLE 9

Figure 13:
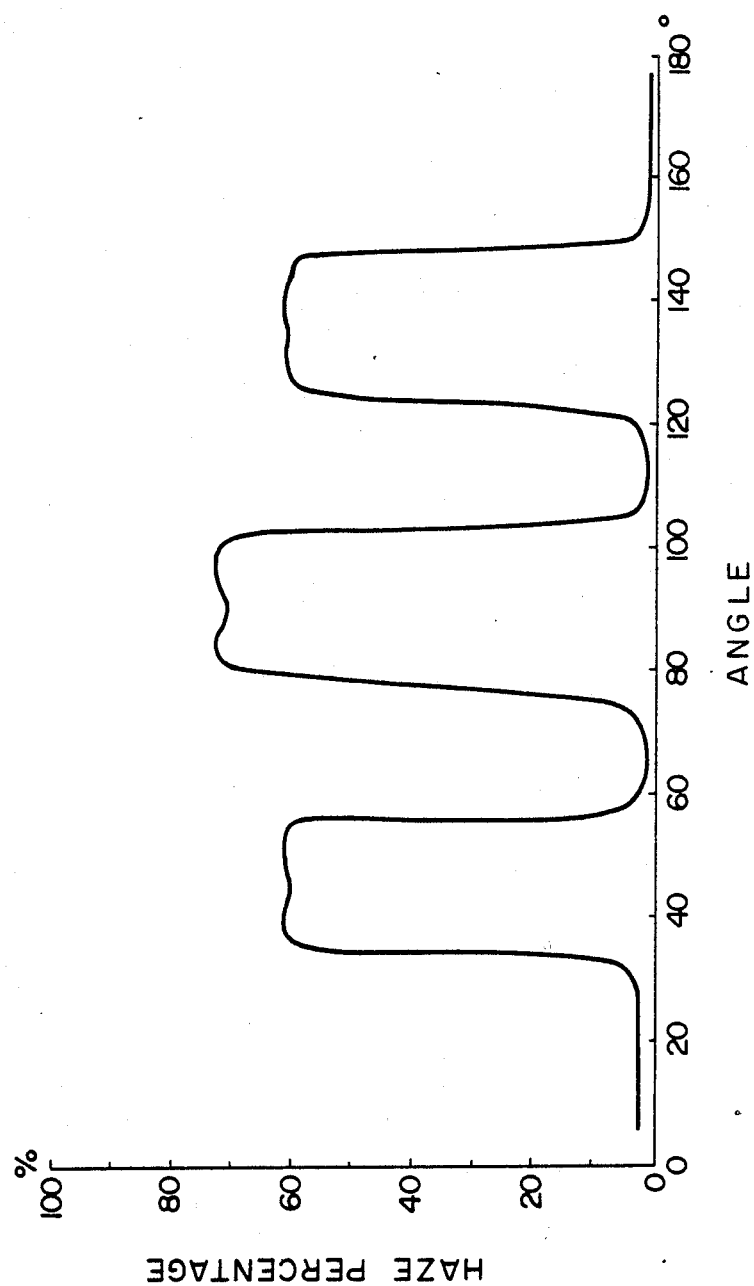

Fifty parts of a bisphenol A type epoxy acrylate having the refractive index of 1.560 was mixed with 50 parts of 2,2,3,3-tetrafluoropropyl acrylate having the refractive index of 1.363 and 3 parts of 2-hydroxy-2-methyl-propiophenone to prepare a resin composition. The composition was poured between two glass plates having a spacer of 1 mm in thickness between them. As shown in FIG. 10, an ultraviolet light was irradiated for 3 minutes at a distance of 40 cm and an angle of 45° using a mercury lamp (80W, 40 cm in length) to cure a cured sheet (I). Similarly, a cured sheet (II) was obtained at an angle of 135° as shown in FIG. 11. The cured sheets (I) and (II) were separated from the glass plates and connected with a spacer of 200 microns in thickness. A resin composition (III) was poured between the cured sheets (I) and (II), and an ultraviolet light was irradiated for 3 minutes at an angle of 0° using the same mercury lamp, as shown in FIG. 12, whereby a cured sheet (IV) of lamination type was obtained. The haze property of the cured sheet (IV) is shown in FIG. 13.

EXAMPLE 10

Figure 14:
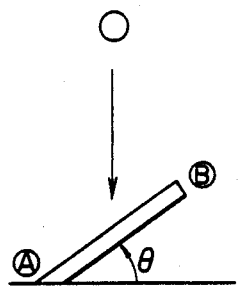
Figure 15:
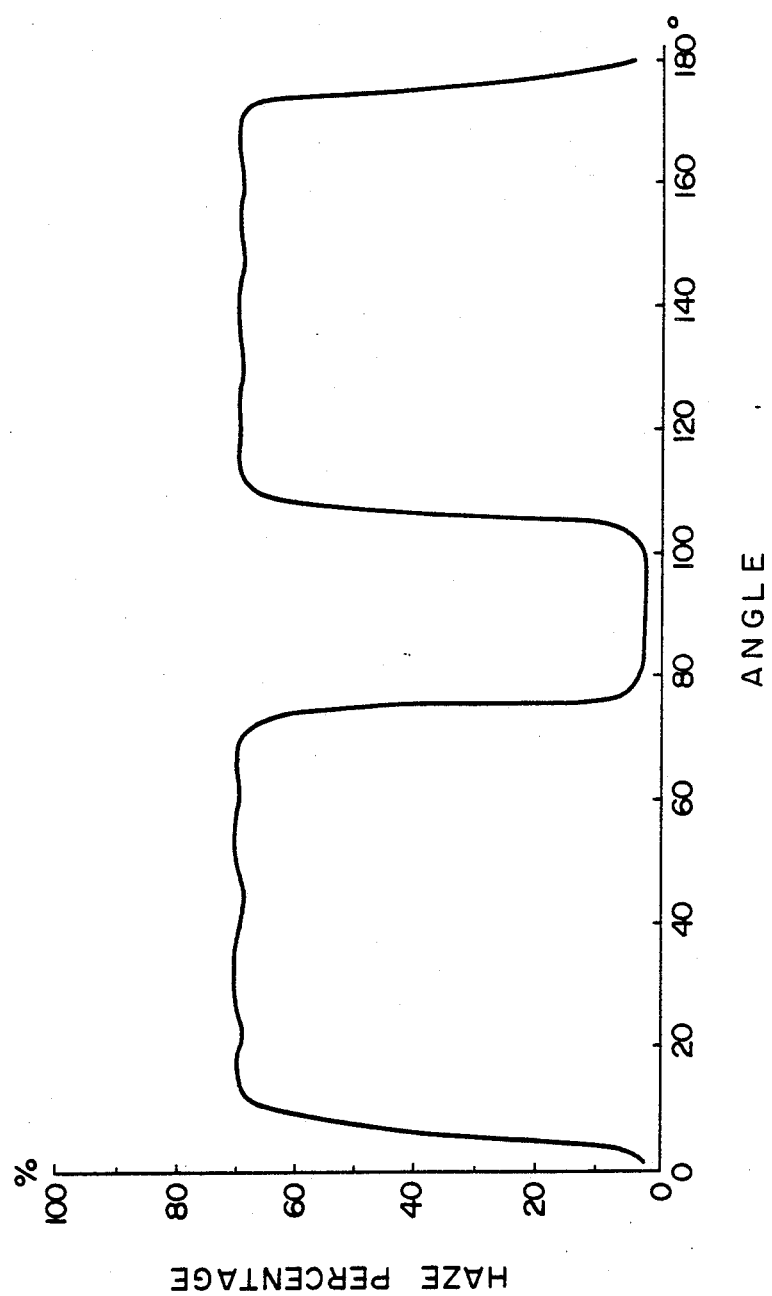

The same resin composition as in Example 9 was poured between two glass plates having a spacer of 200 microns in thickness between them, and an ultraviolet light was irradiated for 3 minutes at a distance of 25 cm and an angle of 30° using a mercury lamp (80W, 25 cm in length), as shown in FIG. 14, to obtain a cured sheet. On this cured sheet was formed a cell comprising one glass plate and the cured sheet having a spacer of 200 microns in thickness between them. The same composition was filled in the cell, and a cured sheet was formed in the same manner as above except that the irradiation angle was 50°. The similar procedures were conducted at irradiation angles of 70°, 110°, 130° and 150°, whereby a lamination type cured sheet comprising 6 cured sheets was obtained. The haze property of the cured sheet is shown in FIG. 15.

EXAMPLE 11

Figure 16:
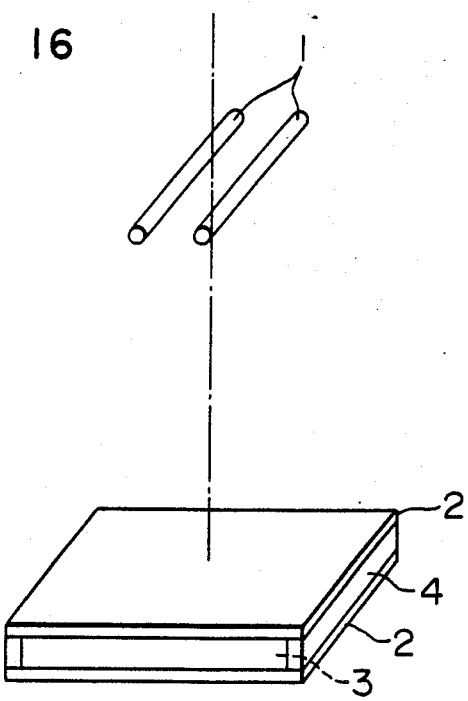

There was prepared a mixture consisting of 100 parts of a polyether-urethane acrylate having the refractive index of 1.481 obtained by the reaction between a polypropylene glycol having an average molecular weight of 2000, hydroxyethyl acrylate and isophorone diisocyanate, 100 parts of tribromophenoxyethyl acrylate having the refractive index of 1.567 and 6 parts of hydroxyisobutylphenone. As shown in FIG. 16, the mixture was poured between horizontally placed two square glass plates 2 and 2 each of 10 cm×10 cm having a spacer 4 of 1 mm in thickness between them, to prepare a film 3. There were provided two bar-shaped ultraviolet lamps 1 (2KW, 2 cm in diameter, 25 cm in light-emitting length) 40 cm (perpendicular distance) above the center of the glass plates so that the two lamps were 40 cm apart from each other, horizontal, parallel to each other and parallel to the side of the glass plates. Then, ultraviolet lights were simultaneously irradiated from the two lamps. By that procedure, there was obtained a light control sheet having an angle range allowing no seeing through of (−30° to +30°) about 1.5 times as wide as that when using one ultraviolet lamp. The angle dependency of the haze percentage of the light control sheet obtained is shown in Table 2.

In Table 2, the angle O denotes a direction of perpendicular to the glass plates, passing the center of the glass plates; the minus (−) angles denote left from the perpendicular; and the plus (+) angles denote right from the perpendicular.

EXAMPLE 12

Figure 17:
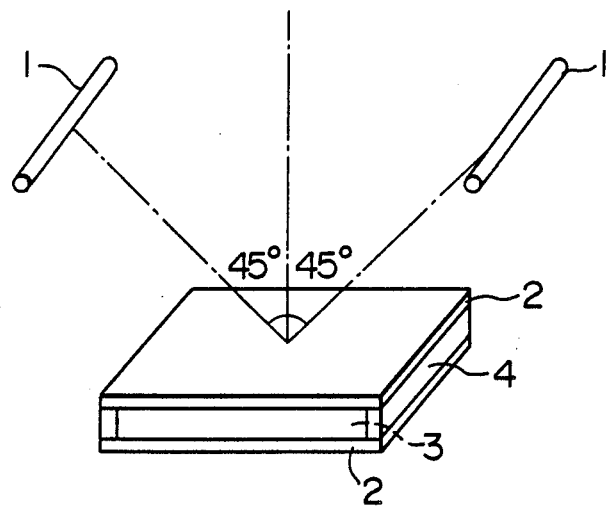

There was prepared a mixture consisting of 100 parts of a bisphenol A type epoxy acrylate, 100 parts of tetrafluoroacrylate and 6 parts of benzyl dimethyl ketal. The composition was poured between two glass plates having a gap of 1 mm. As shown in FIG. 17 marked similar to FIG. 16, two ultraviolet irradiation apparatuses same as used in Example 11 were provided parallel above the glass plates at an angle of left 45° or right 45° from a direction of perpendicular to the glass plates, passing the center of the glass plates, and ultraviolet irradiations from the two light sources were conducted simultaneously. By that procedure, there was produced a light control sheet which was transparent when observed from a direction perpendicular to the sheet but haze when tilted 45° C. rightward or leftward from the perpendicular direction. The angle dependency of haze percentage of the sheet is shown in Table 2.

EXAMPLE 13

There was prepared a mixture consisting of 100 parts of a polyether-urethane acrylate obtained by the reaction between a polytetramethylene ether glycol (Mn=2000), toluene diisocyanate and hydroxyethyl acrylate, 100 part of tribromophenoxyethyl methacrylate and 6 parts of benzyl dimethyl ketal. The mixture was poured between two glass plates having a gap of 1 mm. As shown in FIG. 18 marked similar to FIG. 16, above the center of the glass plates was provided the same bar-shaped ultraviolet lamp as used in Example 12 at a perpendicular distance of 40 cm, and further two ultraviolet irradiation apparatuses were provided parallel to each other at angles of left 60° and right 60° from a perpendicular to the glass plates passing the center of the glass plates. Then, ultraviolet irradiations from the three light sources were conducted simultaneously. By that procedure there was obtained a light control sheet which was hazy when observed from a direction perpendicular to the sheet, becomes transparent when tilted about 30° rightward or leftward from the perpendicular direction, and becomes hazy again when tilted 60° rightward or leftward from the perpendicular direction. The angle dependency of haze percentage of the sheet is show in Table 2.

EXAMPLE 14

The same mixture as in Example 11 was poured between two square glass plates each of 10 cm×10 cm having a spacer of 1 mm in thickness between them. As shown in FIG. 19 marked similar to FIG. 16, above the glass plates were provided four ultraviolet lamps each of 80W/cm, 2KW, 2 cm in diameter and 25 cm in length at a perpendicular distance of 40 cm in a shape similar to a cross. Ultraviolet irradiations from these light sources were conducted simultaneously. The resulting resin sheet was hazy when observed from a direction perpendicular to the sheet and when tilted upward/downward or rightward/leftward but was transparent when placed obliquely to the major axes of the light sources.

The method for measurement of the haze percentage of the present resin sheet is shown in FIG. 20. The angle O denotes a direction perpendicular to the sheet passing the center of the sheet. The haze percentage was measured from a direction of Z axis by rotating the sheet along X axis or Y axis. The measurement results are shown in Table 3.

COMPARATIVE EXAMPLE 1

The same mixture as in Example 11 was poured between two square glass plates each of 10 cm×10 cm having a spacer of 1 mm in thickness between them. An ultraviolet lamp (80W/cm, 2KW, 2 cm in diameter and 25 cm in length) was provided above the glass plates at the perpendicular distance of 40 cm. An ultraviolet light was irradiated for 1 minute to obtain a cured resin sheet. The sheet was hazy when observed from a direction perpendicular to the sheet but transparent when tilted about 30° rightward or leftward from the perpendicular direction. The results of haze percentage measurement are shown in Table 2.

TABLE 2

| | Angle (°) | | | | | | | | | | |
|---|---|---|---|---|---|---|---|---|---|---|---|
| | −75 | −60 | −45 | −30 | −15 | 0 | 15 | 30 | 45 | 60 | 75 |
| Example 11 | 1.0 | 0.7 | 2.8 | 43.5 | 69.3 | 61.8 | 67.3 | 48.1 | 4.6 | 0.9 | 0.9 |
| Example 12 | 1.1 | 61.1 | 66.8 | 55.9 | 1.4 | 0.8 | 1.2 | 58.8 | 68.7 | 60.1 | 1.3 |
| Example 13 | 30.3 | 57.0 | 29.4 | 1.2 | 27.8 | 61.0 | 34.8 | 1.6 | 38.8 | 63.4 | 32.6 |
| Comparative Example 1 | 0.3 | 0.3 | 0.4 | 0.7 | 71.3 | 77.8 | 70.4 | 0.9 | 0.4 | 0.2 | 0.4 |

TABLE 3

| | | Angle of rotation along axis Y (°) | | | | | | | | |
|---|---|---|---|---|---|---|---|---|---|---|
| | | −60 | −45 | −30 | −15 | 0 | 15 | 30 | 45 | 60 |
| Angle of rotation along axis X (°) | −60 | 1.2 | 1.4 | 2.8 | 65.3 | 71.0 | 64.1 | 3.5 | 1.8 | 1.5 |
| | −45 | 1.5 | 1.6 | 3.0 | 65.2 | 71.1 | 64.5 | 3.7 | 2.1 | 1.7 |
| | −30 | 2.2 | 2.4 | 7.5 | 66.2 | 72.3 | 65.5 | 9.1 | 2.9 | 2.4 |
| | −15 | 63.2 | 63.9 | 67.2 | 71.3 | 77.4 | 72.1 | 68.1 | 64.6 | 63.5 |
| | 0 | 69.7 | 70.7 | 72.8 | 76.8 | 82.2 | 74.9 | 73.5 | 71.0 | 70.4 |
| | 15 | 64.1 | 65.6 | 66.8 | 71.4 | 77.6 | 70.8 | 66.7 | 65.9 | 65.0 |
| | 30 | 3.3 | 3.4 | 8.2 | 67.2 | 73.3 | 66.1 | 10.7 | 3.9 | 3.8 |
| | 45 | 1.7 | 1.7 | 3.2 | 67.0 | 71.7 | 65.3 | 4.3 | 1.9 | 1.8 |
| | 60 | 1.6 | 1.7 | 2.6 | 66.7 | 71.7 | 64.7 | 3.8 | 1.8 | 1.5 |

EXAMPLE 15

One hundred parts of a polyether-urethane acrylate having the refractive index of 1.481 obtained by the reaction between a polypropylene glycol having an average molecular weight of 2000, toluene diisocyanate and 2-hydroxyethyl acrylate was mixed with 100 parts of tribromophenoxyethyl acrylate having the refractive index of 1.567 and 6 parts of benzyl dimethyl ketal to prepare a composition 3. As shown in FIG. 21, the composition 3 was coated on an ultraviolet-absorbing film 2 (product of Nippon Carbide Industries Co.) capable of absorbing ultraviolet rays having wavelengths of 390 nm in the coating thickness of 200 microns. A bar-shaped high pressure mercury lamp 1 (80W/cm, 2KW, 2 cm in diameter, 50 cm in length, product of USHIO INC.) was provided 50 cm (perpendicular distance) above the film at an angle of 50° from a direction perpendicular to the film surface so that the lamp became parallel to the film surface and also parallel to a fictious axis X on the film surface. An ultraviolet light from the lamp was irradiated on the coated side of the film for 1 minute to obtain a cured sheet. The cured sheet was measured for light transmittance, haze percentage and ΔYI. The ΔYI was obtained by keeping the cured sheet in a sunshine weatherometer for 500 hours, measuring the yellow index of the resulting sheet using a color difference meter, and calculating its difference from the initial yellow index, namely, ΔYI. The results are shown in Table 4.

EXAMPLE 16

As shown in FIG. 22, the same composition as in Example 15 was poured into a cell constituted by an ordinary glass plate 5, an ultraviolet-absorbing glass plate 4 containing 5% by weight of $TiO_2$ and a spacer 8 of 1 mm in thickness. Then, the composition was cured in the same manner as in Example 1 to obtain a cured sheet 3 where the ordinary glass plate side was directed toward the irradiation light. The sheet was measured for light transmittances, haze percentage and ΔYI. The results are shown in Table 4.

EXAMPLE 17

As shown in FIG. 23, the same resin composition as in Example 15 was poured into a cell constituted by an acrylic resin sheet 7 containing no ultraviolet absorber, an acrylic resin sheet 6 containing an ultraviolet absorber and a spacer 8 of 1 mm in thickness. The composition was cured in the same manner as in Example 1 to obtain a cured sheet 3, where the acrylic resin sheet containing no ultraviolet absorber was directed toward the irradiation light. The sheet was measured for light transmittances, haze percentage and ΔYI. The results are shown in Table 4.

COMPARATIVE EXAMPLE 2

Figure 24:
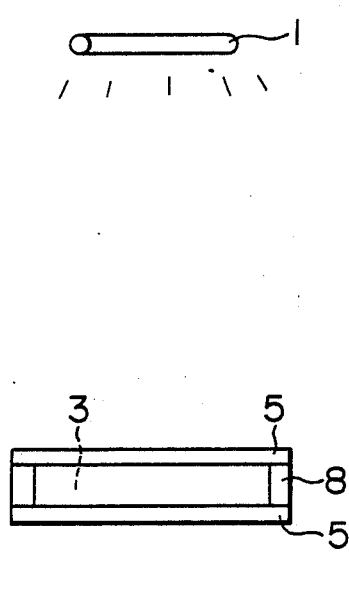

As shown in FIG. 24, the same composition as in Example 15 was poured into a cell constituted by two ordinary glass plates 5 and a spacer 8 of 1 mm in thickness. The composition was cured in the same manner as in Example 16 to obtain a cured sheets 3. The sheet was measured for light transmittances, haze percentage and ΔYI. The results are shown in Table 4.

TABLE 4

|  | Example | | | Comparative |
| --- | --- | --- | --- | --- |
|  | 15 | 16 | 17 | Example 2 |
| Total light transmittance (%) | 90.1 | 80.8 | 87.7 | 88.9 |
| Scattered light transmittance (%) | 70.5 | 60.7 | 67.1 | 66.7 |
| Parallel light transmittance (%) | 19.6 | 20.1 | 30.6 | 22.2 |
| Haze percentage (%) | 78.3 | 75.1 | 76.5 | 75.0 |
| ΔYI | 2.3 | 1.4 | 3.9 | 88.3 |

EXAMPLE 18

Figure 25:
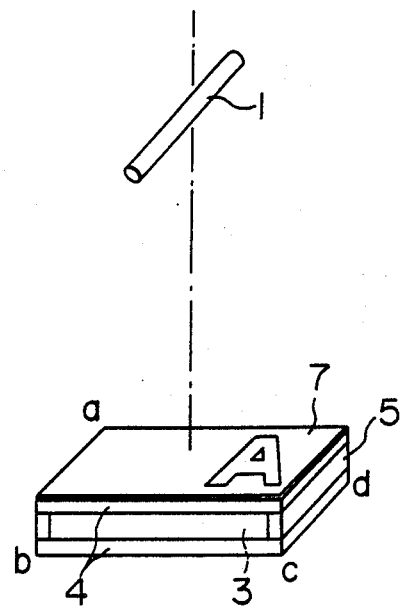
Figure 26:
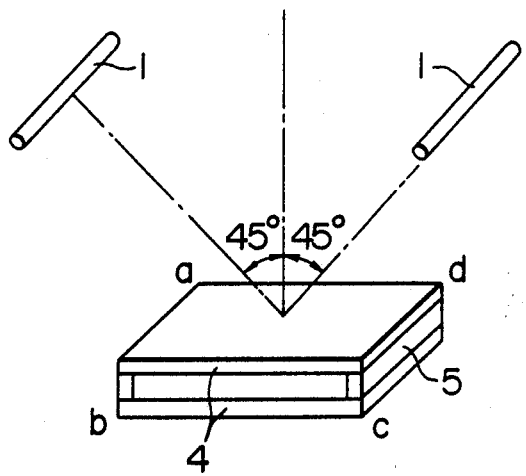

There was prepared a composition consisting of 100 parts of a polyether-urethane acrylate having the refractive index of 1.481 obtained by the reaction between a polypropylene glycol having an average molecular weight of 2000, hydroxyethyl acrylate and isophorone diisocyanate, 100 parts of tribromophenoxyethyl acrylate having the refractive index of 1.567 and 6 parts of hydroxyisobutylphenone. As shown in FIG. 25, the composition was poured between two horizontally placed square glass plates 4 and 4 each of 10 cm × 10 cm having a spacer 5 of 1 mm in thickness between them to form a film 3. A bar-shaped ultraviolet lamp 1 (80W/cm, 2KW, 2 cm in diameter and 25 cm in length) was provided at a distance of 40 cm in a direction perpendicular to the center of the glass plate surface so that the lamp became horizontal and parallel to the sides ab of the glass plates. A photomask 7 having a transmitting portion of letter A shape was placed on the glass plate surface. An ultraviolet lamp was irradiated from the lamp 1 at a visual angle A of 17.4° and a visual angle B of 1.4° to cure the portion of the composition film corresponding to the letter A. Then, the photomask was removed and, as shown in FIG. 26 marked similar to FIG. 25, two ultraviolet lamps 1 and 1 same as the above lamp were provided at a height of 40 cm from the glass plate surface at an angle of right or left 45° from the direction perpendicular to the center of the glass plate surface so that the two lamps became horizontal and parallel to the sides ab of the glass plates. Ultraviolet lights from those lamps were irradiated simultaneously at a visual angle A of 12.4° and a visual angle B of 1.0° to cure the remaining uncured portions of the composition film. By that procedure, there was obtained a light control sheet consisting of two glass plates and a cured resin film. When that light control sheet was observed from a direction perpendicular to the center of the sheet or from directions tilted upward or downward from the perpendicular direction in such a state that the sides ab and cd of the sheet could be seen at the left and the right, respectively, the letter A portion was hazy and the other portions were transparent. When the sheet was tilted 45° rightward or leftward from the perpendicular direction, the letter A portion was transparent and the other portions were hazy. When the sheet was tilted about 22° rightward or leftward from the perpendicular direction or tilted about at least 70° rightward or leftward from the perpendicular direction, all the portions were transparent.

Figure 27:
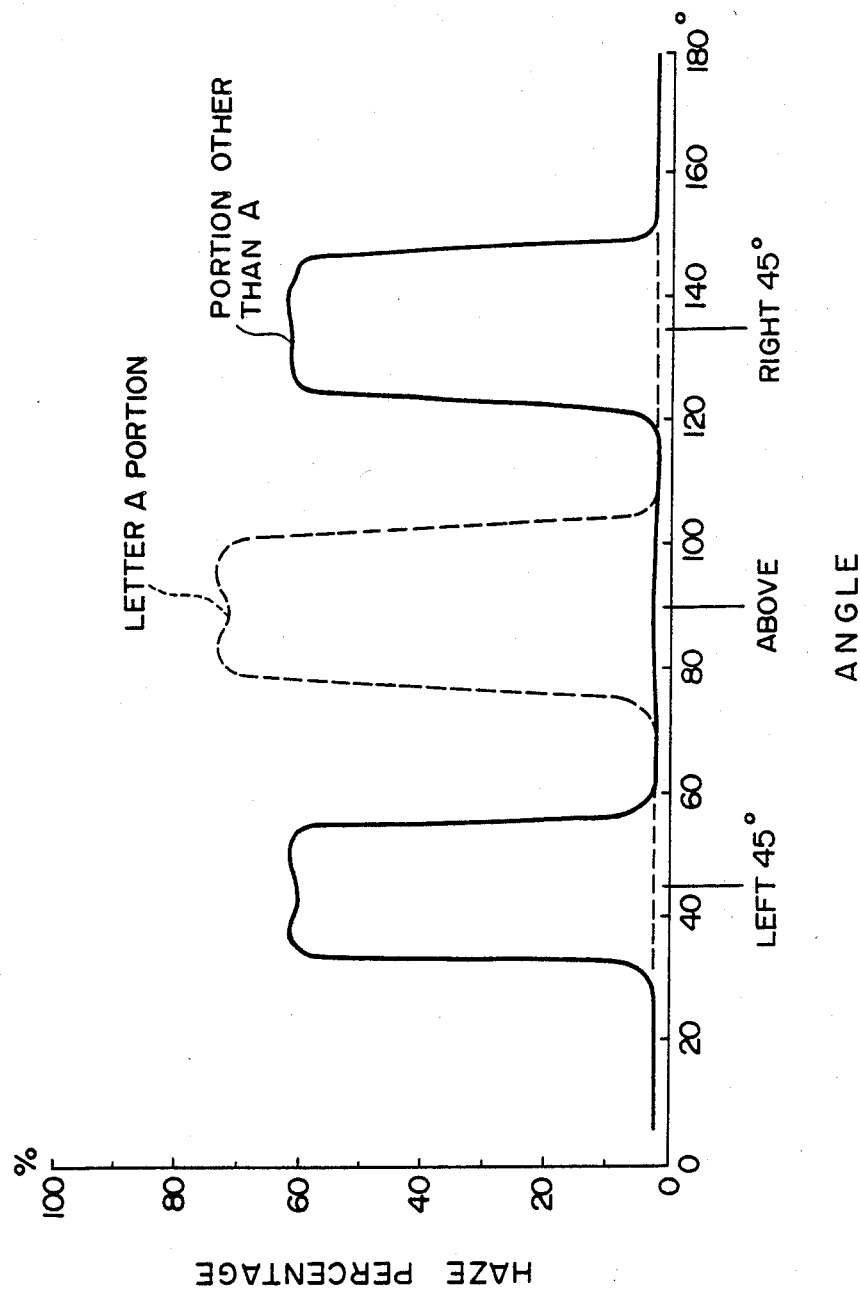

The letter A portion and the other portions were measured for total light transmittance and scattered light transmittance, and the haze percentages of the respective portions were calculated. A number of haze percentages were obtained by rotating the light control sheet along an axis parallel to the side ab to allow a light to enter from directions perpendicular to the side ab and thereby changing the angle of the incident light against the light control sheet. The angle dependency of haze percentage is shown in FIG. 27. In FIG. 27, the dotted line represents the haze percentages of the letter A portion and the solid line those of the other portions.

EXAMPLE 19

Figure 28:
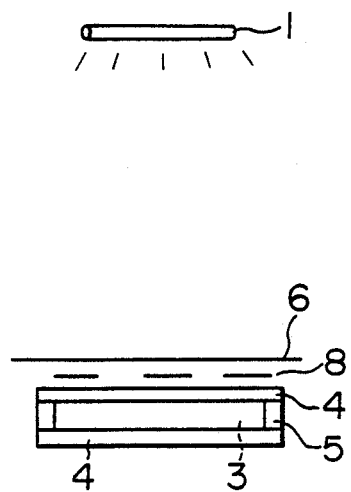
Figure 29:
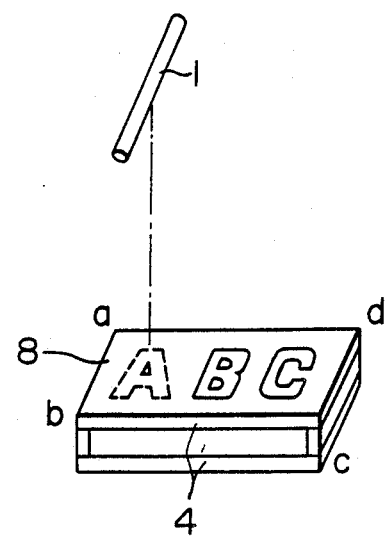
Figure 30:
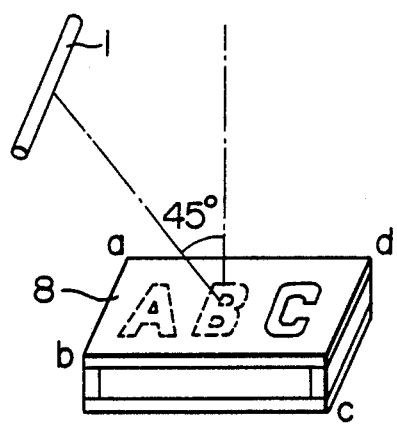
Figure 31:
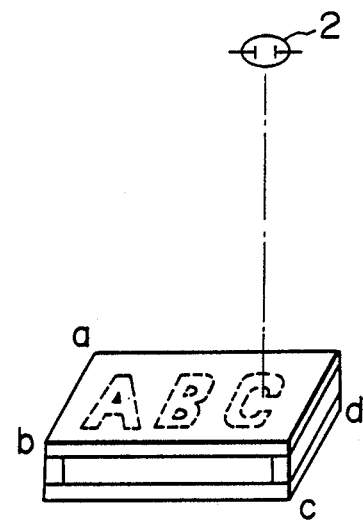
Figure 32:
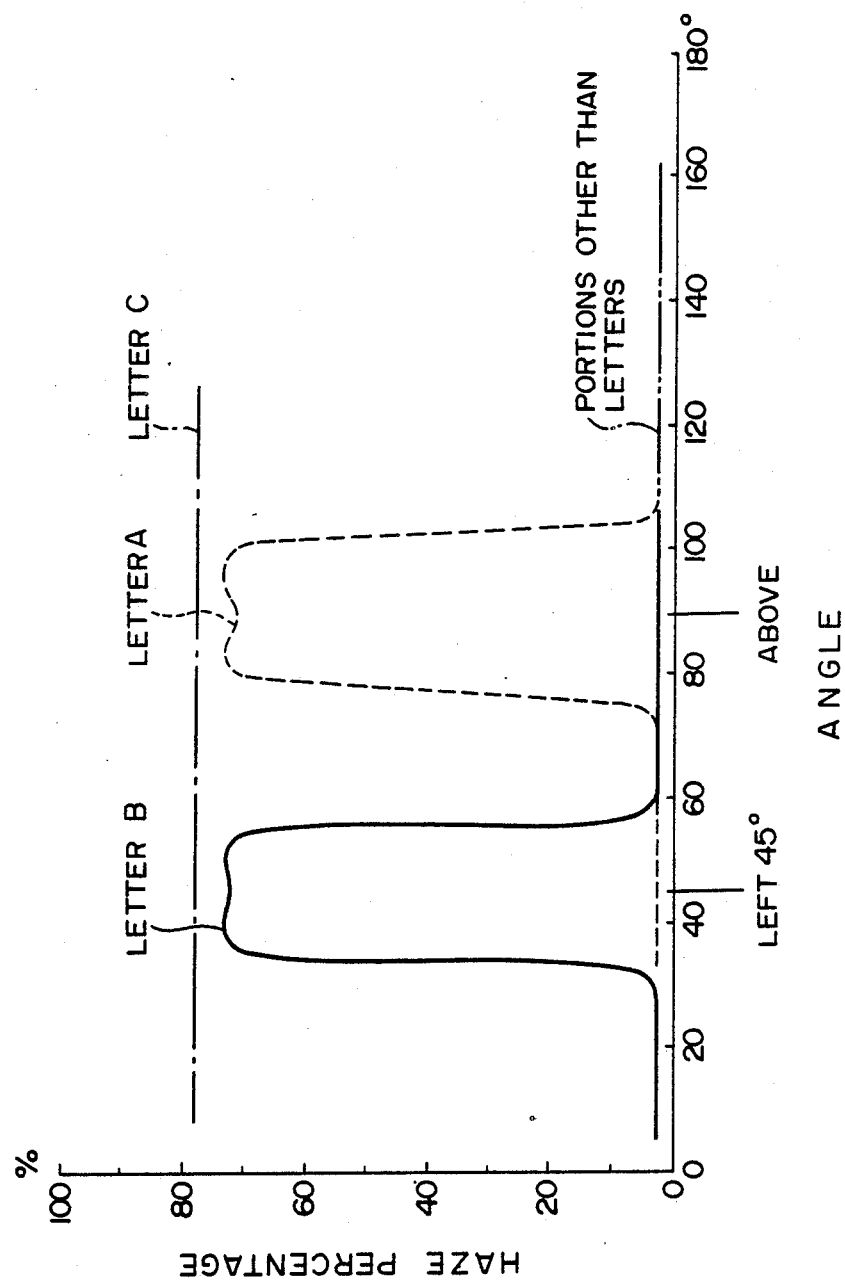

There was prepared a composition consisting of 100 parts of a polyether-urethane acrylate obtained by the reaction between a polytetramethylene ether glycol, toluene diisocyanate and hydroxyethyl acrylate, 100 parts of tribromophenyl methacrylate and 6 part of benzyl dimethyl ketal. The composition was poured between horizontally placed two square glass plates 4 each of 20 cm × 20 cm having a spacer 5 of 1 mm in thickness between them to form a resin film, as shown in FIG. 28. To the glass surface were attached three opaque seals 8 having A, B and C letter shapes, respectively. The glass plate having the seals was kept horizontally and a frosted glass plate 6 was placed thereon. A bar-shaped high-pressure mercury lamp (80W/cm, 2KW, 2 cm in diameter, 25 cm in length) was provided horizontally at a height of 40 cm, and a scattered ultraviolet light was irradiated on the film for 1 minute. Then, the frosted glass plate was removed and the seal A was stripped. As shown in FIG. 29, the same ultraviolet lamp was provided just above the letter A portion so that the lengthwise direction of the lamp became parallel to the side ab of the glass plate, and ultraviolet irradiation was conducted for 1 minute at a visual angle A of 17.4° and a visual angle B of 1.4° to cure the letter A portion. Next, the seal B was stripped, and as shown in FIG. 30, the same ultraviolet irradiation was conducted from a lamp position of left 45° from a direction just above the letter B portion (the lamp was also parallel to the side ab). Lastly, the seal C was stripped, and as shown in FIG. 31, a point type ultrahigh-pressure mercury lamp 2 (2 cm×2 cm in light-emitting dimension) was provided 40 cm just above the letter C portion. An ultraviolet light was irradiated for 2 minutes at a visual angle A of 1.4° and a visual angle B of 1.4°. In the thus obtained light control sheet, the letter A portion was cloudy when observed from just above and transparent when observed from a position at least 30° away from just above to the left or the right; the letter B portion was cloudy when observed from a position 45° away from just above to the left and transparent when observed from the position at least 30° away from a position tilted 45° C. to the left or the right; the letter C portion was cloudy from all directions; and all other portions were transparent from all directions. The degree of transparency or cloudiness remained same when the sheet was tilted upward or downward and the degree changed only when the sheet was tilted leftward or rightward. The angle dependency of haze percentage of the sheet is shown in FIG. 32. In FIG. 32, the dotted line represents the haze percentages of the letter A portion; the solid line represents the haze percentages of the letter B portion; and the line—•—•—represents the haze percentage of the letter C portion.

EXAMPLE 20

There was prepared a mixture consisting of 100 parts of a polyether-urethane acrylate having the refractive index of 1.481 obtained by the reaction between a polypropylene glycol, hydroxyethyl acrylate and isophorone diisocyanate, 100 parts of tribromophenoxyethyl acrylate having a refractive index of 1.567 and 6 parts of hydroxyisobutylphenone. The mixture was poured between two square glass plates 2 each of 10 cm×10 cm having a gap 4 of 1 mm, as shown in FIG. 33. A bar-shaped ultraviolet lamp 1 (80W/cm, 2KW, 2 cm in diameter, 25 cm in length) was provided at a height of 40 cm at a position 45° away to the right from a perpendicular to the glass plate surface passing the plate center so that the lengthwise direction of the lamp became almost parallel to the sides ab of the glass plates. At the other side of the glass plates, another bar-shaped ultraviolet lamp of same type was provided at a distance of 40 cm at a position 45° away to the right from the same perpendicular so that the lengthwise direction of the lamp became almost parallel to the sides ab of the glass plates. A photomask 5 containing an ultraviolet light-transmitting letter X portion and a photomask containing an ultraviolet light-transmitting letter Y portion were placed on the upper and lower surfaces of the glass plates, respectively. Ultraviolet lights were irradiated for about 1 minute from the two lamps at a visual angle A of 12.4° and a visual angle B of 1.0°. Then, the photomask X was removed and instead a frosted glass plate was placed. An ultraviolet light was irradiated from just above the glass plate to cure the uncured portions with a scattered light. In the thus obtained light control sheet 3, as shown in FIG. 34, all the portions were transparent when observed from just above [FIG. 34 (2)]; the letter Y portion was hazy and all other portions were transparent when observed from left 45° [FIG. 34 (1)]; and the letter X portion was hazy and all other portions were transparent when observed from right 45° [FIG. 34 (3-)].

Figure 35:
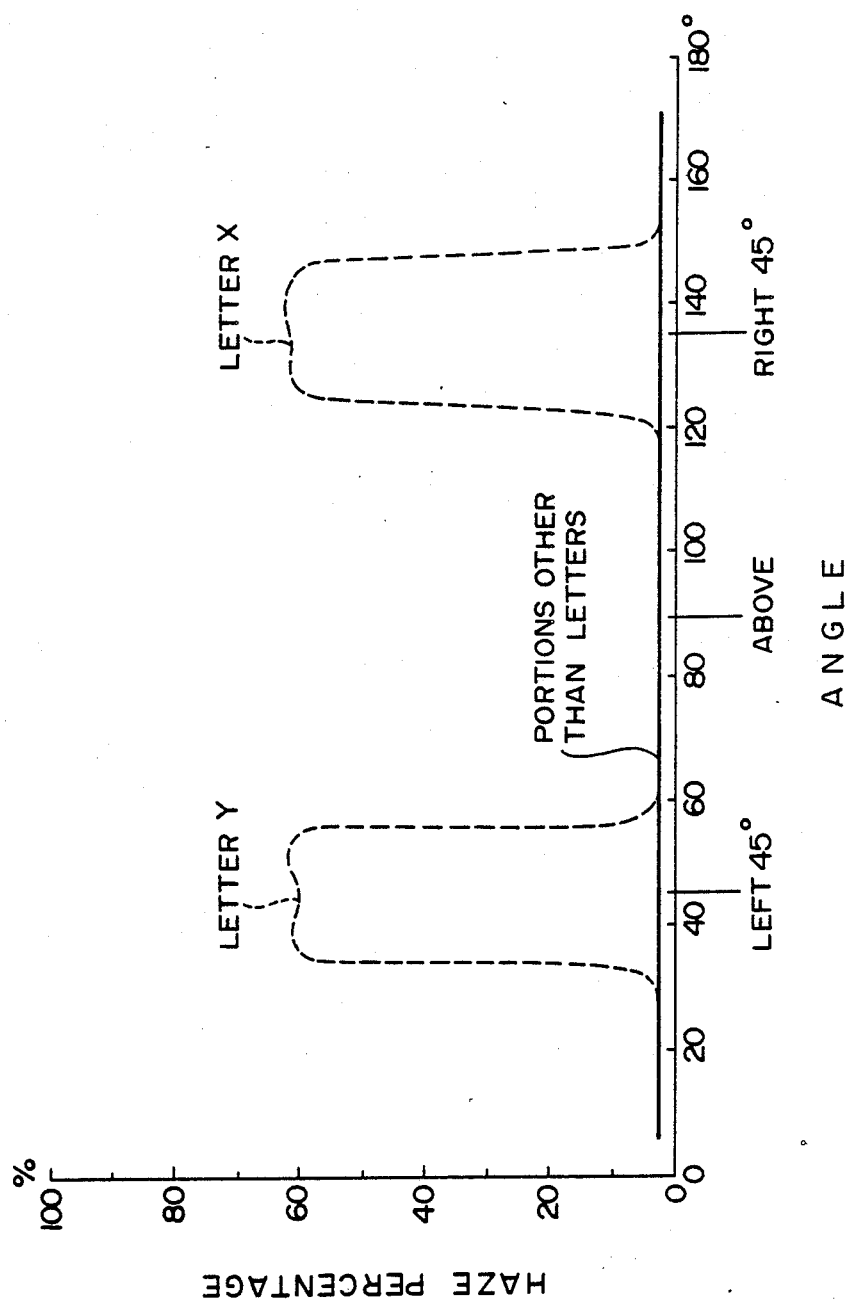

The angle dependency of haze percentage of the sheet is shown in FIG. 35. In FIG. 35, the dotted line represents the haze percentages of the letter X portion and the letter Y portion, and the solid line represents the haze percentages of all other portions.

EXAMPLE 21

Figure 38:
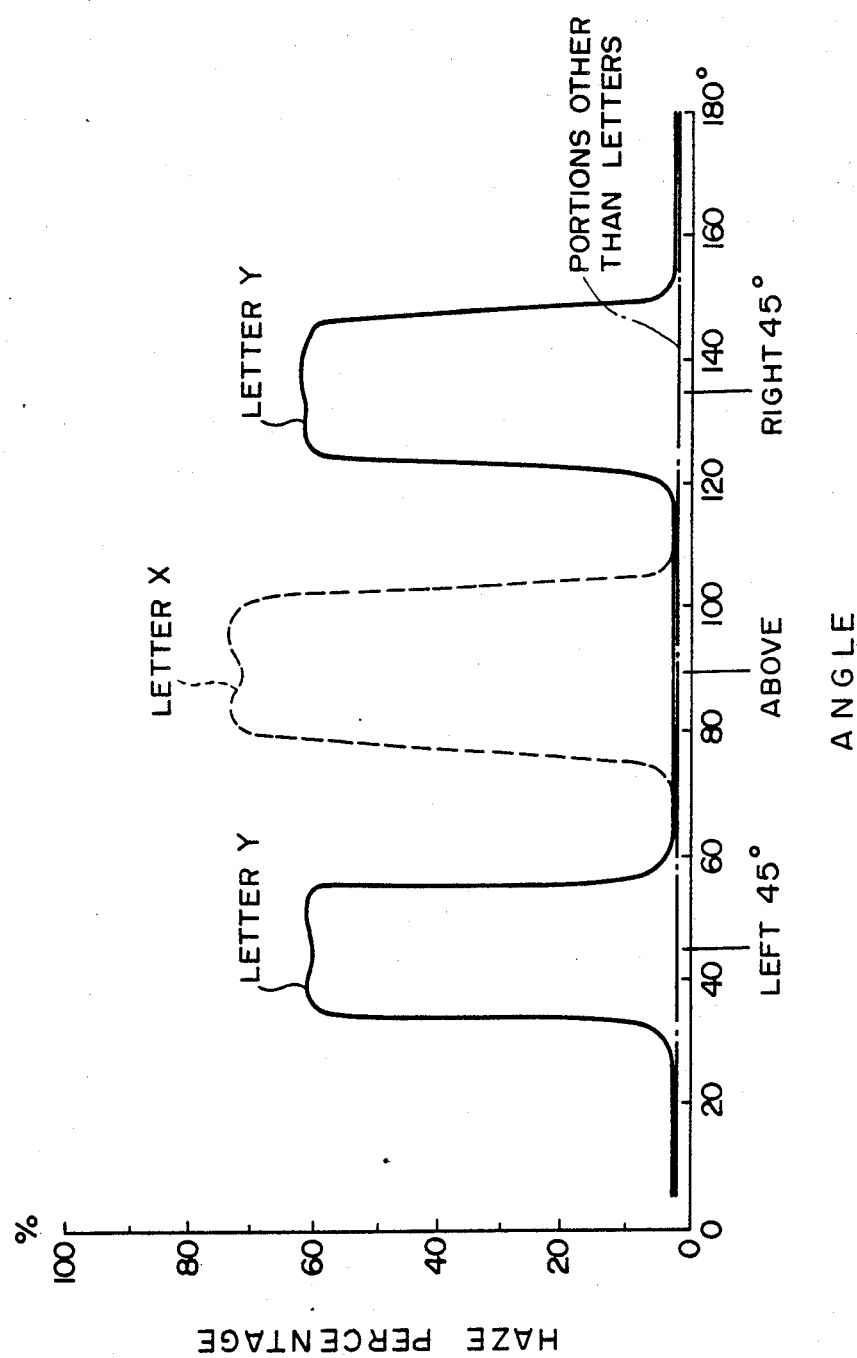

A mixture consisting of 100 parts of a bisphenol A type epoxy acrylate, 100 parts of tetrafluoro acrylate, 6 parts of benzyl dimethyl ketal and 3 parts of benzoyl peroxide was poured between two equare glass plates each of 10 cm×10 cm having a gap of 1 mm, to form a resin film. As shown in FIG. 36 marked similar to FIG. 33, the same bar-shaped ultraviolet lamp (80W/cm) as used in Example 20 was provided just above the center of the glass plate surface at a perpendicular distance of 40 cm so that the lengthwise direction of the lamp became parallel to the sides ab of the glass plates. At the other side of the glass plates, two bar-shaped ultraviolet lamps were provided at a perpendicular distance of 40 cm at positions 45° away to the left and the right from a perpendicular to the glass plate surfaces passing the centers of the plates so that the lengthwise directions of the lamps became parallel to the sides ab of the plates. A photomask containing an ultraviolet-transmitting letter X portion and a photomask containing an ultraviolet-transmitting letter Y portion were placed on the upper and lower surfaces of the glass plates. Ultraviolet lights were simultaneously irradiated from the three lamps for about 1 minute. The photomasks were removed and the glass plates were heated to 80° C. to cure the uncured portions of the film. In the thus produced light control sheet, the letter X portion was hazy and the other portions were transparent when observed from just above [FIG. 37 (2)]; the letter Y portion was hazy and the other portions were transparent when tilted 45° rightward or leftward from a direction perpendicular to the glass plate surfaces [FIG. 37 (1) and (3)]; and all other portions were transparent from all directions. The angle dependency of haze percentage of the sheet is shown in FIG. 38. In FIG. 38, the dotted line represents the haze percentages of the letter X portion; the solid line represents the haze percentages of the letter Y portion; and the represents the haze percentages of all other portions.

EXAMPLE 22

Figure 39:
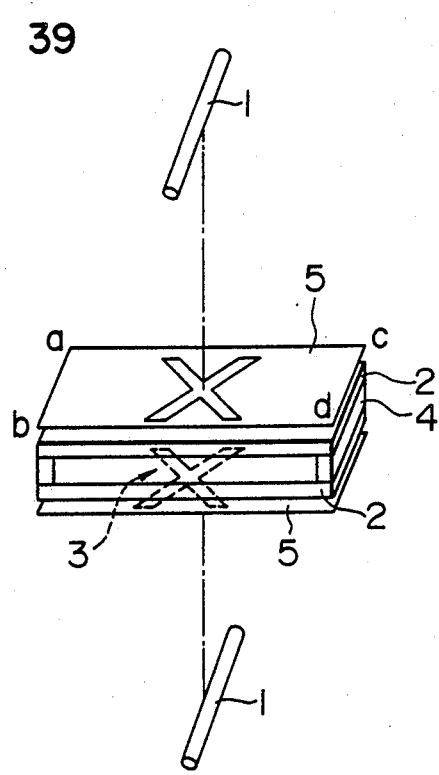
Figure 40:
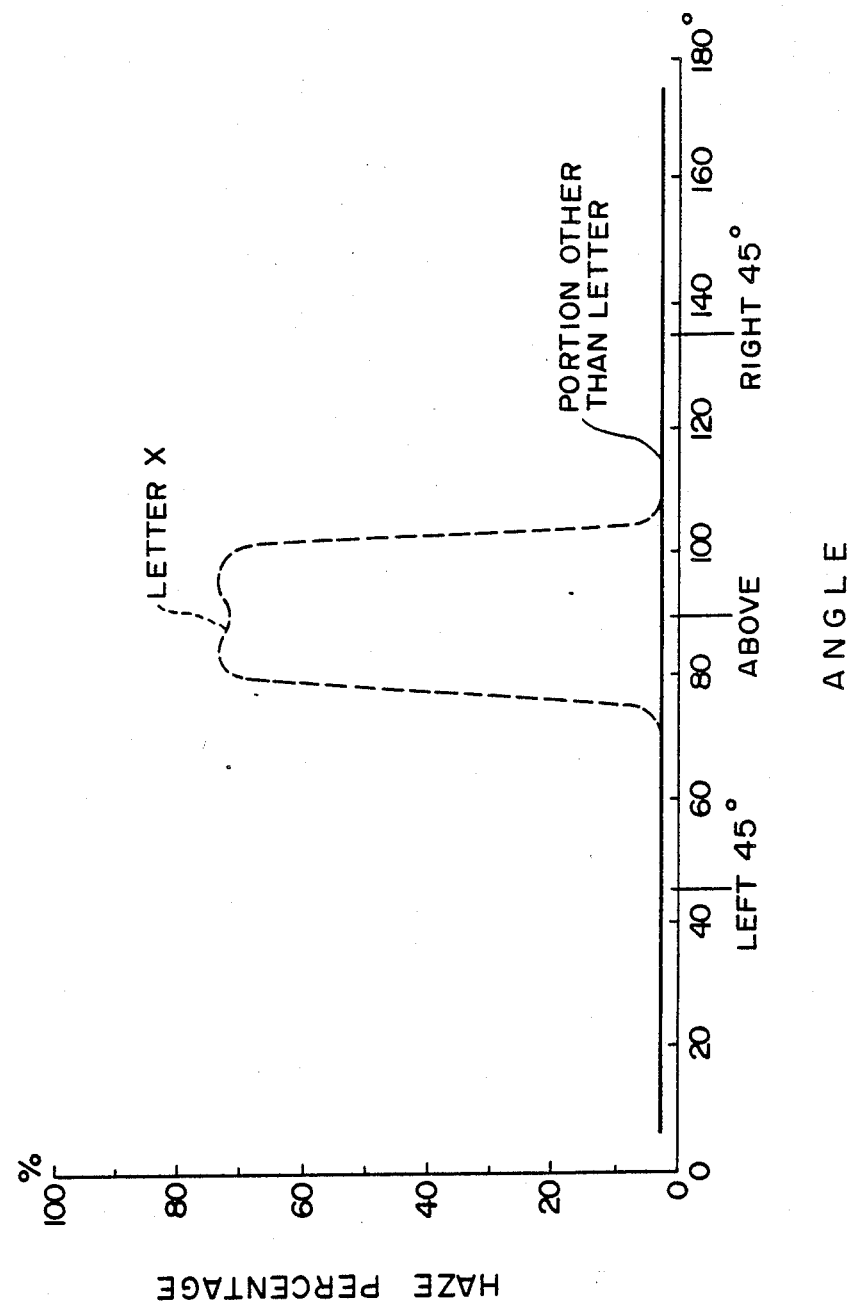

A mixture consisting of 100 parts of a poly-ether-urethane acrylate obtained by the reaction between a polytetramethylene ether glycol, toluene diisocyanate and hydroxyethyl acrylate, 100 parts of tribromophenoxyethyl methacrylate and 6 parts of benzyl dimethyl ketal was poured between two equare glass plates each of 10 cm×10 cm having a gap of 1 mm. As shown in FIG. 39 marked similar to FIG. 33, the same bar-shaped ultraviolet lamp (80W/cm) as used in Example 20 was provided at a direction of a perpendicular to the glass plate surfaces passing the plate centers, at a distance of 40 cm so that the lengthwise direction of the lamp became parallel to the sides ab of the plates. At the other side of the glass plates, another bar-shaped ultraviolet lamp was provided at a direction of the same perpendicular at a distance of 40 cm so that the lengthwise direction of the lamp became parallel to the sides ab of the plates. A photomask containing an ultraviolet-transmitting letter X portion was placed on the upper surface of the plates, and a same type photomask was placed on the lower surface of the plates so that the two X letters overlapped almost but deviated only slightly. Ultraviolet lights were simultaneously irradiated from the two lamps for about 1 minute. The two photomasks were removed and a frosted glass plate was placed. An ultraviolet light (a scattered ultraviolet light) was irradiated from right above to cure the uncured portions. In the thus produced light control sheet, the two letter X portions were hazy and had depth and decorativeness when observed from just above; and all portions were transparent when tilted rightward or leftward. The angle dependency of haze percentage of the sheet is shown in FIG. 40. In FIG. 40, the dotted line represents the haze percentages of the letter X portions and the solid line represents the haze percentages of the other portions.

We claim:

1. A light control sheet capable of scattering a plurality of incident lights each of particular incident angle, said sheet being produced according to a process comprising a first step of preparing a film of a composition composed of at least two photopolymerizable components having different refractive indexes and irradiating on said film a light from a particular direction to obtain a first cured film, a second step of preparing on the first cured film a film of a composition composed of at least two photopolymerizable compositions having different refractive indexes and irradiating on said film a light from a particular direction different from that in the first step to obtain a second cured film on the first cured film, and a step of repeating the second step, if desired.

2. A light control sheet having one portion with a first shape capable of scattering an incident light of particular incident angle and another portion with a second shape capable of scattering an incident light of particular incident angle different from that in the former portion, said sheet being produced according to a process comprising stages of preparing a film of a composition composed of at least two photopolymerizable components having different refractive indexes, providing at one side of the film a photomask of a first shape and a first light source so that the photomask is placed between the film and the first light source, providing at the other side of the film a photomask of a second shape and a second light source so that the photomask is placed between the film and the second light source, and irradiating simultaneously lights from the first and second light sources through individual photomask to obtain two cured film portions having the first shape and the second shape, respectively.

3. A light control sheet having one portion with a first shape capable of scattering an incident light of particular incident angle and another portion with a second shape capable of scattering an incident light of particular incident angle different from that in the former portion in which the two portions partially overlap with each other, said sheet being produced according to a process comprising stages of preparing a film of a composition composed of at least two photopolymerizable components having different refractive indexes, providing at one side of the film a photomask of a first shape and a first light source so that the photomask is placed between the film and the first light source, providing at the other side of the film a photomask of a second shape and a second light source so that the photomask is placed between the film and the second light source, and irradiating simultaneously lights from the first and second light source through individual photomask to obtain two cured film portions having the first shape and the second shape, respectively.

4. A process for producing a light control sheet capable of scattering an incident light of particular incident angle, which comprises stages of preparing a film of a composition composed of at least two photopolymerizable components having different refractive indexes and irradiating on said film a light from a particular direction to obtain a cured film,
  wherein a light source of the light for irradiating has the visual angle A in the major axis direction of at least 8° and the visual angle B in the minor axis direction of A/4 or smaller when viewed from a site of the composition film receiving irradiation and the cured film is capable of scattering an incident light of a particular incident angle.

5. A process for producing a light control sheet capable of scattering a plurality of incident lights each of particular incident angle or an incident light of wide incident angle range, which comprises stages of preparing a film of a composition composed of at least two photopolymerizable components having different refractive indexes and irradiating simultaneously on the film a plurality of lights each from a particular direction of a plurality of light sources provided apart from each other to obtain a cured film.
  wherein a light source of the light for irradiating has the visual angle A in the major axis direction of at least 8° and the visual angle B in the minor axis direction of A/4 or smaller when viewed from a site of the composition film receiving irradiation and the cured film is capable of scattering an incident light of a particular incident angle.

6. A process for producing a light control sheet having at least one portion capable of scattering a first incident light of particular incident angle and at least one other portion capable of scattering a second incident light of particular incident angle different from that of the frist incident light of totally hazy or totally transparent, the process comprising a first step of preparing a film of a composition composed of at least two photopolymerizable components having different refractive indexes and irradiating a light from a particular direction on at least one of the divided film portions to obtain at least one cured film portion, and a second step of curing at least one film portion other than said cured portion by (a) irradiation of a light from a direction and/or light source different from that for the first step or by (b) a curing method different from that for the first step,
  wherein a light source of the light for irradiating has the visual angle A in the major axis direction of at least 8° and the visual angle B in the minor axis direction of A/4 or smaller when viewed from a site of the composition film receiving irradiation and the cured film is capable of scattering an incident light of a particular incident angle.

7. A process for producing a light control sheet having one portion with a first shape capable of scattering an incident light of particular incident angle and another portion with a second shape capable of scattering an incident light of particular incident angle different from that in the former portion, the process comprising stages of preparing a film of a composition composed of at least two photopolymerizable components having different refractive indexes, providing at one side of the film a photomask of a first shape and a first light source so that the photomask is placed between the film and the first light source, providing at the other side of the film a photomask of a second shape and a second light source so that the photomask is placed between the film and the second light source, and irradiating simultaneously lights from the first and second light sources through individual photomask to obtain two cured portions having the first shape and the second shape, respectively.

8. A process for producing a light control sheet having one portion with a first shape capable of scattering an incident light of particular incident angle and another portion with a second shape capable of scattering an incident light of particular incident angle different from that in the former portion in which the two portions partially overlap with each other, the process comprising stages of preparing a film of a composition composed of at least two photopolymerizable components having different refractive indexes, providing at one side of the film a photomask of a first shape and a first light source so that the photomask is placed between the film and the first light source, providing at the other side of the film a photomask of a second shape and a second light source so that the photomask is placed between the film and the second light source, and irradiating simultaneously lights from the first and second light sources through individual photomask to obtain two cured portions having the first shape and second shape, respectively.

9. A process for producing a light control sheet capable of scattering a plurality of incident lights each of particular incident angle, which comprises a first step of preparing a film of a composition composed of at least two photopolymerizable components having different refractive indexes and irradiating on said film a light from a particular direction to obtain a first cured film, a second step of preparing on the first cured film a film of a composition composed of at least two photopolymerizable compositions having different refractive indexes and irradiating on said film a light from a particular direction different from that in the first step to obtain a second cured film on the first cured film, and a step of repeating the second step, if desired.

10. A process for producing a light control sheet according to claims 9 or 7 wherein a light source of the light for irradiating has the visual angle A in the major axis direction of at least 8° and the visual angle B in the minor axis direction of A/4 or smaller when viewed from a site of the composition film receiving irradiation and the cured film is capable of scattering an incident light of a particular incident angle.

* * * * *